United States Patent
Yasumura

(10) Patent No.: US 7,145,785 B2
(45) Date of Patent: Dec. 5, 2006

(54) SWITCHING POWER SUPPLY CIRCUIT

(75) Inventor: Masayuki Yasumura, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 11/217,926

(22) Filed: Sep. 1, 2005

(65) Prior Publication Data

US 2006/0062025 A1    Mar. 23, 2006

(30) Foreign Application Priority Data

Sep. 17, 2004    (JP)    ............... 2004-271920

(51) Int. Cl.
  *H02M 3/335*    (2006.01)
(52) U.S. Cl. ............................ 363/16; 363/69
(58) Field of Classification Search ............ 363/16, 363/21.02, 21.03, 69, 22, 23
See application file for complete search history.

(56) References Cited

U.S. PATENT DOCUMENTS

| 6,285,567 | B1 * | 9/2001 | Kennedy ............... 363/21.01 |
| 6,483,721 | B1 | 11/2002 | Terashi et al. |
| 6,654,259 | B1 | 11/2003 | Koshita et al. |
| 6,934,167 | B1 * | 8/2005 | Jang et al. ............ 363/21.02 |

FOREIGN PATENT DOCUMENTS

| JP | 06-327246 A | 11/1994 |
| JP | 2000-134925 A | 5/2000 |
| JP | 2000-152617 A | 5/2000 |
| JP | 2003-235259 A | 8/2003 |

* cited by examiner

*Primary Examiner*—Shawn Riley
(74) *Attorney, Agent, or Firm*—Lerner, David, Littenberg, Krumholz & Mentlik, LLP

(57) ABSTRACT

A power supply circuit is disclosed which performs constant voltage control by switching frequency control and is ready for a wide range while the necessary control range of the switching frequency control is reduced. The circuit includes a primary side series resonance circuit forming a current resonance type converter, and a secondary side series resonance circuit formed from secondary windings and secondary side series resonance capacitors while a coupling type resonance circuit by electromagnetic coupling of an insulating converter transformer is formed. To obtain a single-humped characteristic from the coupling type resonance circuit, a gap of approximately 1.6 mm is formed in the core of the insulating converter transformer so as to achieve a coupling coefficient of 0.65 or less. A secondary side DC output voltage is produced from outputs of the secondary windings so as to cope with a heavy load condition.

11 Claims, 14 Drawing Sheets fo1>fo2 fo1≒fo2(fo1×0.9∼1.1=fo2)

fo1<fo2

VAC=100V, Pomax=150W

VAC=230V, Pomax=150W (PRIOR ART)

(PRIOR ART)

SWITCHING POWER SUPPLY CIRCUIT

CROSS REFERENCES TO RELATED APPLICATIONS

The present invention contains subject matter related to Japanese Patent Application JP 2004-271920 filed in the Japanese Patent Office on September, 2004, the entire contents of which being incorporated herein by reference.

BACKGROUND OF THE INVENTION

This invention relates to a switching power supply circuit which is provided as a power supply in various pieces of electronic equipment.

Meanwhile, the assignee of the present patent application has proposed various power supply circuits wherein a resonance type converter is provided on the primary side.

FIG. 14 is a circuit diagram showing an example of a switching power supply circuit which includes a resonance type converter and is formed based on the invention applied for patent in advance by the assignee of the present application.

Referring to FIG. 14, the power supply circuit shown includes a switching converter configured such that a partial voltage resonance circuit which performs a voltage resonance operation only upon turning off during switching is combined with a separately excited current resonance converter in which a half bridge coupling method is used.

First, in the power supply circuit shown in FIG. 14, a common mode noise filter formed from two filter capacitors CL and a common mode choke coil CMC is connected to a commercial AC power supply AC.

Further, as a rectification smoothing circuit for producing a DC input voltage from the commercial AC power supply AC, a full wave rectification circuit formed from a bridge rectification circuit Di and a smoothing capacitor Ci is provided at the following stage of the common mode noise filter.

A rectification output of the bridge rectification circuit Di is charged into the smoothing capacitor Ci. Consequently, across the smoothing capacitor Ci, a rectified smoothed voltage Ei (DC input voltage) equal to the AC input voltage VAC is obtained.

The current resonance capacitor which receives the DC input voltage as an input thereto to perform switching includes a switching circuit system formed from two switching devices Q1 and Q2 each in the form of a MOS-FET which are coupled by half bridge coupling as seen in FIG. 14. Damper diodes DD1 and DD2 formed from body diodes are connected in parallel in a direction shown in FIG. 14 between the drain-source of the switching devices Q1 and Q2, respectively.

A partial resonance capacitor Cp is connected in parallel between the drain and the source of the switching device Q2. A parallel resonance circuit (partial voltage resonance circuit) is formed from the capacitance of the partial resonance capacitor Cp and the leakage inductance L1 of a primary winding N1. By the partial voltage resonance circuit, a partial voltage resonance operation wherein voltage resonance occurs only upon turning off of the switching devices Q1 and Q2 is obtained.

In the power supply circuit, in order to switching drive the switching devices Q1 and Q2, an oscillation and driving circuit 2 formed from, for example, a general purpose IC is provided. The oscillation and driving circuit 2 includes an oscillation circuit and a driving circuit, and applies a drive signal (gate voltage) having a predetermined frequency to the gates of the switching devices Q1 and Q2. Consequently, the switching devices Q1 and Q2 perform the switching operation so as to alternately change over between an on state and an off state in the predetermined switching frequency.

An insulating converter transformer PIT (Power Isolation Transformer) transmits the switching output of the switching devices Q1 and Q2 to the secondary side.

A primary winding N1 of the insulating converter transformer PIT is connected at an end thereof to a node (switching output point) between the source of the switching device Q1 and the drain of the switching device Q2 through a primary side series resonance capacitor C1. Consequently, a switching output can be obtained.

The primary winding N1 is connected at the other end thereof to the primary side ground as shown in FIG. 14.

The series resonance capacitor C1 and the primary winding N1 are connected in series to each other. In particular, a primary side series resonance circuit for making the operation of the switching converter that of the current resonance type is formed from the capacitance of the series resonance capacitor C1 and the leakage inductance L1 of the primary winding N1 (series resonance winding) of the insulating converter transformer PIT.

According to the forgoing description, the primary side switching converter shown in FIG. 14 performs an operation as that of the current resonance type by the primary side series resonance circuit (L1-C1) and a partial voltage resonance operation by the partial voltage resonance circuit (Cp//L1) described above.

In particular, the power supply circuit shown in FIG. 14 is formed such that a resonance circuit for making a primary side switching converter as that of the resonance type and a different resonance circuit are combined with each other. Here, such a switching converter as just described is hereinafter referred to as composite resonance type converter.

While description given with reference to the drawings is omitted, the insulating converter transformer PIT includes an EE type core formed by combining E type cores formed from, for example, a ferrite material. A winding portion of the EE type core is divided into portions of the primary side and the secondary side, and the primary winding N1 and a secondary winding N2 are wound around an inner magnetic leg of the EE type core.

Further, a gap of 1.0 mm or less is formed in the inner magnetic leg of the EE type core of the insulating converter transformer PIT such that a coupling coefficient of 0.80 or more is obtained between the primary and secondary windings N1 and N2.

Actually, the gap G is set to G=1.0 mm, and the turn number of the primary winding N1 is set to N1=35 T (turns) and the turn number of the secondary winding N2 is set to N2=8 T so that a coupling coefficient K=approximately 0.80 can be obtained.

A center tap is provided for the secondary winding N2 of the insulating converter transformer PIT and connected to the secondary side ground as shown in FIG. 14. Further, a full wave rectification circuit is provided for the secondary winding N2 of the insulating converter transformer PIT and is formed from a rectification diode Do1, another rectification diode Do2 and a smoothing capacitor Co.

Consequently, as a voltage across the smoothing capacitor Co, a secondary side DC output voltage Eo which is a DC voltage of a level equal to the AC voltage excited by the secondary winding N2 is obtained. The secondary side DC output voltage Eo is supplied as a main DC power supply to a main load not shown, and is branched and inputted also as a detection voltage for constant voltage control to a control circuit 1.

It is to be noted that, in this instance, the rectification diodes Do1 and Do2 which form a full wave rectification circuit are actually formed from a single element in the form of a twin Schottky barrier diode TSD as indicated by a broken line framework in FIG. 14.

The control circuit 1 outputs a control signal as a voltage or current whose level is adjusted in response to the level of the secondary side DC output voltage Eo to the oscillation and driving circuit 2.

In the oscillation and driving circuit 2, the frequency of a switching driving signal to be applied to the gates of the switching devices Q1 and Q2 is varied based on the control signal inputted from the control circuit 1 so that an oscillation signal frequency produced by the oscillation circuit in the oscillation and driving circuit 2 is adjusted. Consequently, the switching frequency is adjusted. In this manner, since the switching frequency of the switching devices Q1 and Q2 is adjustably controlled in response to the level of the secondary side DC output voltage Eo, also the resonance impedance of the primary side DC resonance circuit is varied and the energy to be transmitted from the primary winding N1 which forms the primary side series resonance circuit to the secondary side is adjusted. Therefore, also the level of the secondary side DC output voltage Eo is adjustably controlled. As a result, constant voltage control of the secondary side DC output voltage Eo is implemented.

It is to be noted that the constant voltage controlling method of adjustably controlling the switching frequency to achieve stabilization in this manner is hereinafter referred to as "switching frequency controlling method".

FIG. 15 is a waveform diagram illustrating operation of several components of the power supply circuit shown in FIG. 14. In FIG. 15, the waveforms on the left side indicate operation at the load power Po=150 W, but the waveforms on the right side indicate operation at the load power Po=25 W. The input voltage condition is set to the AC input voltage VAC=100 V fixed.

It is to be noted that, in this instance, the secondary side DC output voltage Eo is produced so as to have a voltage of 25 V.

Further, in the circuit shown in FIG. 14, in response to such a load condition and an input voltage condition as described above, several components are selectively set as follows:

insulating converter transformer PIT: gap G=1.0 mm, coupling coefficient k=0.80
primary winding N1=35 T
secondary winding N2=8 T (4 T+4 T across the center tap)
primary side series resonance capacitor C1=0.047 μF
partial resonance capacitor Cp=330 pF First, a voltage V1 indicated by a rectangular waveform in FIG. 15 is a voltage across the switching device Q2, and indicates on/off timings of the switching device Q2.

A period of time within which the level of the voltage V1 is 0 is an on period within which the switching device Q2 conducts. Within the on period, switching current IQ2 shown by the waveform in FIG. 15 flows to the switching circuit system formed from the switching device Q2 and the clamp diode DD2. Further, a period of time within which the voltage V1 is clamped to the level of the rectified smoothed voltage Ei is a period of time within which the switching device Q2 is off, and the level of the switching current IQ2 is 0 as seen in FIG. 15.

Further, though not shown in the drawings, a voltage across the switching device Q1 and switching current to be supplied to the switching circuit (Q1, DD1) are obtained with waveforms wherein the phases thereof are shifted by 180 degrees from those of the voltage V1 and the switching current IQ2. In particular, as described above, the switching devices Q1 and Q2 perform a switching operation at timings at which they are changed over between on and off alternately.

Further, primary side series resonance current Io to flow to the primary side series resonance circuit (C1-N1(L1)) is produced by combining the switching current flowing in the switching circuit (Q1, DD1) and the switching current flowing in the switching circuit (Q2, DD2), and the resulting current flows in accordance with the waveform shown in FIG. 15.

Further, for example, if the waveforms of the voltage V1 shown in FIG. 15 when the load power Po=150 W and when the load power Po=25 W are compared with each other, then it is recognized that the switching frequency on the primary side when the secondary side DC output voltage Eo is in a heavy load condition (Po=150 W) is controlled so as to be lower than that when the secondary side DC output voltage Eo is in a light load condition (Po=25 W). In particular, the switching frequency is controlled so as to become low in response to a drop of the level of the secondary side DC output voltage Eo when a heavy load condition is entered, but become high in response to an increase of the level of the secondary side DC output voltage Eo when a light load condition is entered. This indicates the fact that the constant voltage controlling operation by upper side control is performed as a switching frequency controlling method.

Further, by performing the operation on the primary side described above, an AC voltage V2 having a waveform shown in FIG. 15 is induced in the secondary winding N2 of the insulating converter transformer PIT. Then, within a period of one of half cycles within which the waveform of the AC voltage V2 indicates the positive polarity, the rectification diode Do1 on the secondary side conducts to allow rectification current ID1 to flow with the waveform and at the timing shown in FIG. 15. Further, within a period of the other half cycle within which the waveform of the AC voltage V2 indicates the negative polarity, the rectification diode Do2 on the secondary side conducts to allow rectification current ID2 to flow with the waveform and at the timing shown in FIG. 15. Further, in the full wave rectification circuit on the secondary side, rectification output current I2 flowing between the center tap of the secondary winding N2 and the secondary side ground is produced by combining the rectification current ID1 and the rectification current ID2 as seen in FIG. 15.

FIG. 16 is a graph illustrating the AC to DC power conversion efficiency with respect to the load variation and a characteristic of the switching frequency of the power supply circuit shown in FIG. 14 under the input voltage condition of the AC input voltage VAC=100 V.

First, the switching frequency fs decreases as the load becomes heavier in response to performance of the constant voltage controlling operation. However, this is not a characteristic that the switching frequency fs linearly varies with respect to the load variation, but the switching frequency fs is inclined to increase steeply within a range, for example, from the load power Po=approximately 25 W to Po=0 W.

Further, the AC→DC power conversion efficiency (ηAC→DC) is inclined to increase as the load power Po increases, and particularly when the load power Po=150 W, a result is obtained that AC to DC power conversion efficiency ηAC→DC is 90% or more.

Incidentally, where the configuration as a resonance type converter which stabilizes the secondary side DC output voltage by the switching frequency controlling method is applied as in the power supply circuit shown in FIG. 14, the variable control range of the switching frequency for stabilization is inclined to be a comparatively wide range.

This is described with reference to FIG. 17. FIG. 17 illustrates the constant voltage control characteristic of the power supply circuit shown in FIG. 14 as a relationship between the switching frequency fs and the level of the secondary side DC output voltage Eo.

It is to be noted that the description given with reference to FIG. 17 presupposes that the upper side control is adopted as the switching frequency controlling method by the power supply circuit shown in FIG. 14. Here, the upper side control is a control method wherein the switching frequency is variably controlled within a frequency range higher than the resonance frequency fo of the primary side series resonance circuit such that the level of the secondary side DC output voltage Eo is controlled making use of the variation of the resonance impedance caused by the variable control of the switching frequency.

Generally, a series resonance circuit exhibits the lowest resonance impedance at the resonance frequency fo. Consequently, as a relationship in the upper side control between the secondary side DC output voltage Eo and the switching frequency fs, the level of the secondary side DC output voltage Eo increases as the switching frequency fs comes nearer to the resonance frequency fo1, but decreases as the switching frequency fs goes away from the resonance frequency fo1.

Accordingly, as seen in FIG. 17, the level of the secondary side DC output voltage Eo with respect to the switching frequency fs under the condition that the load power Po is fixed indicates such a quadratic curve variation that the level exhibits a peak when the switching frequency fs is equal to the resonance frequency fo1 of the primary side series resonance circuit but decreases as the switching frequency fs goes away from the resonance frequency fo1.

Further, where the level of the secondary side DC output voltage Eo at the minimum load power Pomin and the level of the secondary side DC output voltage Eo at the maximum load power Pomax corresponding to the same switching frequency fs are compared with each other, a characteristic that the level of the secondary side DC output voltage Eo is shifted so as to decrease by a predetermined amount can be obtained at the maximum load power Pomax rather than at the minimum load power Pomin. In particular, where it is considered that the switching frequency fs is fixed, the level of the secondary side DC output voltage Eo decreases as the load becomes heavier.

Then, if it is attempted under such a characteristic as described above to stabilize the secondary side DC output voltage Eo so as to be Eo=tg by the upper side control, then the variable range (necessary control range) of the switching frequency necessary for the power supply circuit shown in FIG. 14 is a range indicated by reference character Δfs in FIG. 17.

Actually, the power supply circuit shown in FIG. 14 performs constant voltage control so that the secondary side DC output voltage Eo may be stabilized, for example, at the secondary side DC output voltage Eo=25 V using the switching frequency controlling method in accordance with the input variation range of the AC input voltage VAC=85 V to 120 V of the AC 100 V system and the load conditions of the maximum load power Pomax=150 W and minimum load power Pomin=0 W (no load) to the secondary side DC output voltage Eo which is the main DC power supply.

In this instance, the variable range of the switching frequency fs varied by the power supply circuit shown in FIG. 14 in order to perform constant voltage control is a range from fs=80 kHz to 200 kHz or more, and also the variable range Δfs is 120 kHz or more and is a wide range in its own way.

A power supply circuit formed so as to be capable of operating in response to, for example, an AC input voltage range of approximately AC 85 V to 288 V so that the power supply circuit can be ready for, for example, areas of the AC input voltage AC 100 V system such as Japan, U.S.A and so forth and areas of the AC 200 V system such as Europe and so forth, that is, a power supply circuit ready for a wide range, is known.

Thus, it is examined to form the power supply circuit shown in FIG. 14 as a power supply circuit ready for the wide range described above.

The power supply circuit ready for the wide range is ready for, for example, the AC input voltage range of AC 85 V to 288 V as described above. Accordingly, when compared with an alternative case wherein the power supply circuit is ready for a single range of, for example, only the AC 100 V system or only the AC 200 V system, also the variation range of the level of the secondary side DC output voltage Eo becomes great. In order to carry out constant voltage control for such a secondary side DC output voltage Eo having a level variation range increased corresponding to the wide AC input voltage range as just described, an increased switching frequency control range is required. For example, in the circuit shown in FIG. 14, it is necessary to expand the control range of the switching frequency fs to a range of approximately 80 kHz to 500 kHz.

However, in an existing IC (oscillation and driving circuit 2) for driving a switching device, the upper limit to the driving frequency for which it is ready is approximately 200 kHz. Further, even if a switching driving IC which can drive at such a high frequency as described above is formed and mounted, where a switching device is driven at such a high frequency as described above, the power conversion efficiency decreases remarkably. Therefore, the switching driving IC cannot be practically used as an actual power supply circuit. It is to be noted that the upper limit to the level of the AC input voltage VAC which can be stabilized, for example, by the power supply circuit shown in FIG. 14 is approximately 100 V.

Therefore, it is known that, if it is tried to make a switching power supply circuit, which uses the switching frequency control method for stabilization, actually ready for the wide range, then, for example, such countermeasures as described just below are taken.

As one of the countermeasures, a rectification circuit system for receiving a commercial AC power supply as an input thereto to produce a DC input voltage (Ei) is provided with a function of performing changeover between a voltage doubler rectification circuit and a full wave rectification circuit in response to an input of the commercial AC power supply of the AC 100 V system or the AC 200 V system.

In this instance, the circuit is formed such that the commercial AC power supply level is detected and the circuit connection in the rectification circuit system is changed over in response to the detected level by a switch in which electromagnetic relays are used so as to form the voltage doubler rectification circuit or the full wave rectification circuit.

However, in such a configuration as just described which involves changeover of the rectification circuit, a required number of electromagnetic relays are required as described above. Further, it is necessary to provide at least two smoothing capacitors in order to form the voltage doubler rectification circuit. Therefore, the cost is increased by increase of the number of components and also the mounting area of a circuit board of the power supply circuit is increased, which increases the scale of the power supply circuit. Particularly, since the smoothing capacitors and the electromagnetic relays are large among various components for forming the power supply circuit, the size of the circuit board becomes considerably great.

It is assumed here that, where the configuration wherein a full wave rectification operation and a voltage doubler rectification operation are changed over is used, if the level of the AC input voltage while a commercial AC power supply of the AC 200 V system is inputted becomes lower than that ready for the AC 200 V system because instantaneous interruption occurs or because the AC input voltage drops to a level lower than the rated voltage, then a malfunction occurs that changeover to the voltage doubler rectification circuit is performed because it is detected in error that an AC input voltage of the AC 100 V system is inputted. If such a malfunction as just described occurs, then voltage doubler rectification is performed for the AC input voltage actually of the level of the AC 200 V system. Therefore, the resulting voltage exceeds the withstanding voltage, for example, of the switching devices Q1 and Q2, and as a result, there is the possibility that the switching devices Q1 and Q2 may be broken.

Therefore, in order to prevent occurrence of such a malfunction as described above, an actual circuit is configured such that not only the DC input voltage of a switching converter which is a main switching converter but also the DC input voltage of a converter circuit on the standby power supply side are detected. Consequently, components for detecting the converter circuit on the standby power supply circuit side are additionally provided, and as a result, increase of the cost and increase of the size of the circuit board described above are further promoted.

Further, that the DC input voltage of the converter on the standby power supply side is detected in order to prevent the malfunction signifies that the power supply circuit which includes a circuit for changing over the rectification operation and is ready for the wide range can be used actually only for electronic equipment which includes not only a main power supply but also a standby power supply. In particular, the type of an electronic apparatus capable of incorporating the power supply is limited to that of an electronic apparatus which includes a standby power supply, and as a result, the utilization range decreases as much.

Further, as one of configurations ready for the wide range, also a configuration is known wherein the type of the current resonance converter on the primary side is changed over between the half bridge coupling type and the full bridge coupling type in response to an input of a commercial AC power supply of the AC 100 V system/AC 200 V system.

In the configuration described, even if the level of the AC input voltage of the AC 200 V system decreases to that of the AC 100 V system, for example, as a result of instantaneous interruption or the like as described above and causes a malfunction, only the switching operation is changed over from the half bridge operation to the full bridge operation, but the withstanding voltage of the switching device and so forth is not exceeded. Therefore, the DC input voltage on the standby power supply side need not be detected, and the present configuration can be applied to an electronic apparatus which does not include a standby power supply. Further, since the changeover in the configuration is not that on the commercial power supply line and the circuit form can be changed over by a semiconductor switch, a large-size switching member such as an electromagnetic relay need not be provided.

However, according to the configuration described above, in order to form the full bridge coupling so as to implement the configuration ready for an input of the AC 100 V system, it is necessary to provide at least four switching devices. In other words, when compared with the configuration of a converter which can be formed from two switching devices and to which only the half bridge coupling method is applied, two additional switching devices must be provided.

Further, according to the configuration, four switching devices perform the switching operation in the full bridge operation, but also in the half bridge operation, three switching devices perform the switching operation. While the resonance converter can be operated with low switching noise, as the number of switching devices which perform switching in this manner increases, the disadvantage increases as regards switching noise.

Also where any one of the configurations described above is adopted as a configuration ready for the wide range, when compared with a configuration ready for a single range, increase of the cost and increase of the circuit size arising from increase of the number of parts or the like cannot be avoided. Further, new problems which do not appear with the configuration ready for a single range such as a limit to the utilization range to equipment in the case of the former configuration and increase of switching noise in the case of the latter configuration and so forth appear.

Further, where the control range of the switching frequency is suitably wide as in the power supply circuit shown in FIG. 14, also a problem appears that the high speed response characteristic of stabilization of the secondary side DC output voltage Eo degrades.

Depending upon an electronic apparatus, there is the possibility that the load condition may vary in such a manner as to instantaneously change over, for example, between a maximum load state and a substantial no load state. A load which exhibits such a load variation as just described is sometimes called switching load. The power supply circuit to be incorporated in an apparatus which serves as a switching load as just described must be configured so that the secondary side DC output voltage is optimally stabilized so that it is ready also for the load variation of the switching load described above.

However, where the control range of the switching frequency is wide as described with reference to FIG. 17, in order to adjust the switching frequency to a switching frequency with which the secondary side DC output voltage is adjusted to a required level in response to the load variation of a load like such a switching load as described above, a comparatively long period of time is required. In short, an unfavorable result is obtained as the response characteristic of the constant voltage control.

Particularly, as shown in FIG. 16, as the switching frequency characteristic by constant voltage control by the power supply circuit shown in FIG. 14, the switching frequency varies by a great amount within the load range of the load power Po from Po=approximately 25 W to Po=0 W. Therefore, it is recognized that the power supply circuit is disadvantageous in the responsibility in constant voltage control for such a switching load as described above.

It is desirable to provide a power supply circuit which performs constant voltage control by switching frequency control and is ready for a wide range while the necessary control range of the switching frequency control is reduced.

SUMMARY OF THE INVENTION

According to an object of the present invention, it is desirable to provide a switching power supply circuit including switching means including a switching element for receiving a DC input voltage as an input thereto to perform switching, switching driving means for switching driving the switching element operation, an insulating converter transformer formed by winding a primary winding to which a switching output obtained by the switching operation of the switching means is supplied and a plurality of secondary windings in each of which an alternating voltage is induced by the primary winding, a primary side series resonance circuit formed from at least a leakage inductance component of the primary winding of the insulating converter transformer and the capacitance of a primary side series resonance capacitor connected in series to the primary winding such that a first resonance frequency is set for making the operation of the switching means that of a current resonance type, a plurality of secondary side series resonance circuits each formed from at least a leakage inductance component of one of the plural secondary windings of the insulating converter transformer and the capacitance of a secondary side series resonance capacitor connected in series to the plural secondary winding such that a second resonance frequency is set, secondary side DC output voltage production means for performing a rectification operation for the AC voltages obtained by the secondary windings and smoothing the rectification outputs of the plural secondary windings by means of a common secondary side smoothing capacitor to produce a secondary side DC output voltage, and constant voltage control means for controlling the switching driving means in response to the level of the secondary side DC output voltage to adjust the switching frequency of the switching means to perform constant voltage control for the secondary side DC output voltage. The insulating converter transformer further includes a core which has a gap formed at a predetermined position thereof, the gap having a gap length set so that an output characteristic of an electromagnetic coupling type resonance circuit formed from the primary side and secondary side series resonance circuits when a frequency signal having the switching frequency is inputted to the electromagnetic coupling type resonance circuit becomes a single-humped characteristic.

The switching power supply circuits each adopts a configuration of a switching converter in which a primary side series resonance circuit which makes a switching operation of the primary side that of the current resonance type is formed, and includes a series resonance circuit formed also on the secondary side. Where the switching power supply circuit has the configuration just described, if the gap length of the gap formed in the core of the insulating converter transformer whose electromagnetic coupling is utilized to form a coupling type resonance circuit is set to a predetermined length to obtain a predetermined coupling coefficient, then a steep single-humped characteristic can be obtained as an output characteristic for an alternating voltage of a switching frequency which is an input to the coupling type resonance circuit. As a result, when compared with an alternative configuration wherein a series resonance circuit is formed only on the primary side, the variable range (necessary control range) of the switching frequency necessary for stabilization can be reduced.

Further, in the switching power supply circuit, a plurality of secondary windings are wound on the secondary side, and rectification outputs from alternating voltages obtained from the secondary windings are smoothed by the common secondary side smoothing capacitor to produce a secondary side DC output voltage. With the configuration just described, the secondary side DC output voltage can be produced based on the outputs of the plural secondary windings provided in parallel to each other.

This makes it possible to reduce the level of the rectification current on the secondary side for coping with the same load condition when compared with an alternative case wherein only one secondary winding is used.

With the switching power supply circuit, since the variable control range (necessary control range) of the switching frequency necessary for constant voltage control is reduced when compared with that in the switching power supply circuit of the related art, the switching power supply circuit can be easily made ready for the wide range only by means of switching frequency control.

Where the configuration ready for the wide range by switching frequency control is implemented in this manner, the necessity to adopt a configuration for performing changeover between rectification circuit systems or changeover of a circuit, for example, between half bridge coupling and full bridge coupling, for example, in response to the rated level of a commercial AC power supply is eliminated.

Consequently, reduction of the number of circuit components and reduction of the circuit board area can be achieved as much. Further, such an advantage can be achieved that the application range of the switching power supply circuit to electronic apparatus is expanded and reduction of switching noise is anticipated.

As a basic configuration for implementing such a configuration of the invention as described above, only it is necessary to provide at least a secondary side series resonance capacitor to the configuration which includes a series resonance circuit only on the primary side. Consequently, the switching power supply circuit which is ready for the wide range can be implemented by addition of a very small number of parts.

Further, where the necessary control range for the switching frequency is reduced in such a manner as described above, for example, if the load power varies at a high speed between a maximum load condition and a no-load condition, then also the responsibility of the constant voltage control is enhanced. In this regard, a high degree of reliability can be achieved.

Furthermore, with the switching power supply circuit, since the secondary side DC output voltage is produced based on the outputs of the plural secondary windings, when the same load condition is coped with, the level of the rectification current on the secondary side can be reduced. Consequently, for example, the conduction loss of the rectification elements on the secondary side can be reduced, and also where a heavy load condition is to be coped with, the drop of the power conversion efficiency can be suppressed. In short, the switching power supply circuit can be ready for a heavier load condition.

Further, if the current level to flow in the secondary windings can be reduced, then also the current withstanding property of the rectification elements on the secondary side can be reduced, and consequently, reduction of the circuit board area can be achieved using a rectification element of a reduced size.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
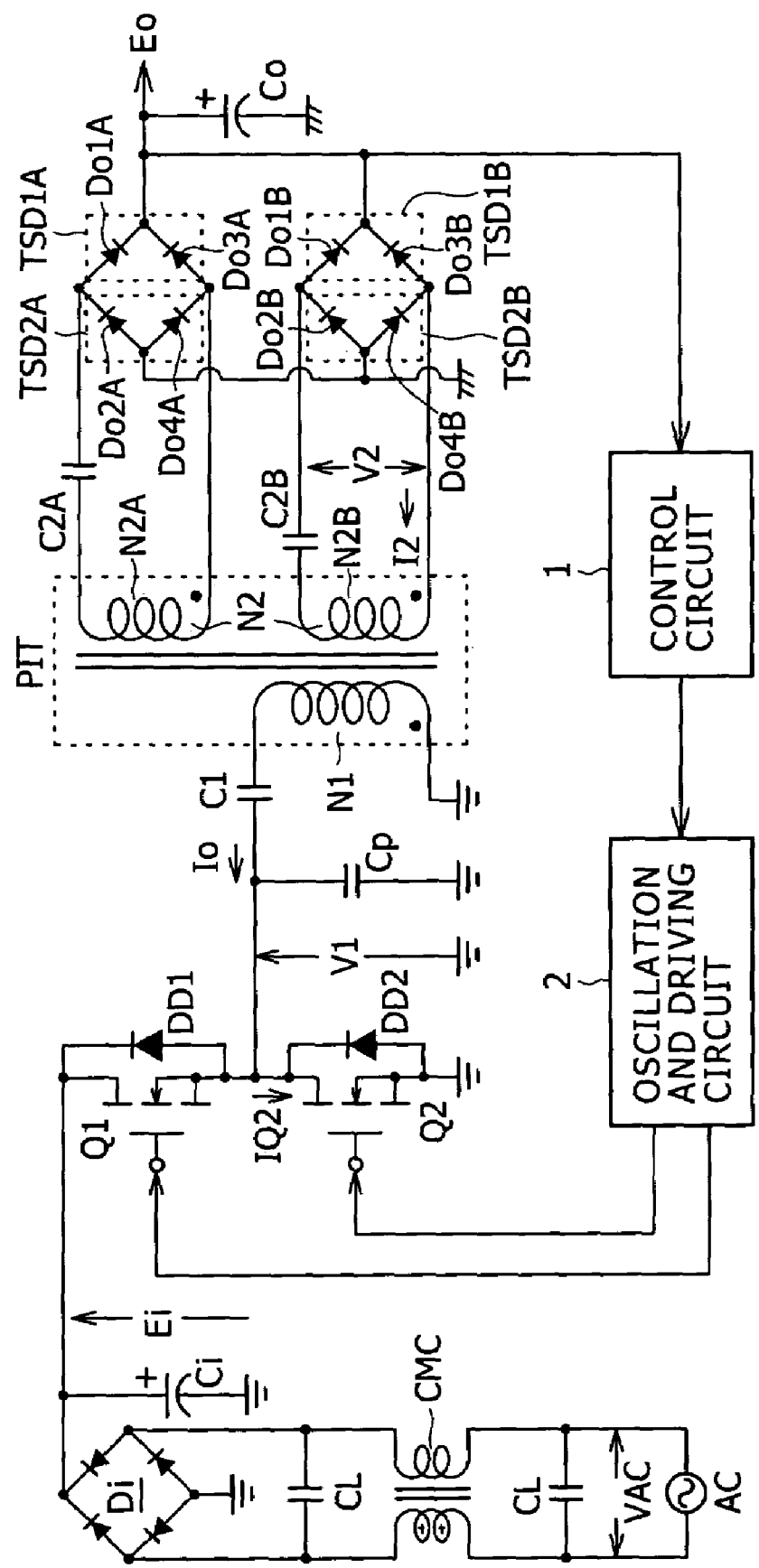
FIG. 1 is a circuit diagram showing an example of a configuration of a power supply circuit according to a first embodiment of the present invention.

FIG. 1 shows an example of a configuration of a switching power supply circuit to which the present invention is applied. Referring to FIG. 1, the power supply circuit shown includes, as a basic configuration of the primary side thereof, a combination of a partial voltage resonance circuit with a current resonance type converter of the half bridge coupling type.

The power supply circuit of the present first embodiment has a configuration ready for the wide range by which it operates with both of commercial AC power supply inputs of the AC 100 V type and the AC 200 V type. Further, as regards the applicable load power, the power supply circuit is ready for a variation range of the load power Po, for example, from Po=approximately 150 W to 0 W (no load). Also in this instance, an secondary side DC output voltage Eo of, for example, approximately 25 V is obtained similarly as in the case of the circuit described hereinabove with reference to FIG. 14.

In particular, in the power supply circuit shown in FIG. 1, a common mode noise filter is formed from a pair of filter capacitors CL and a common mode choke coil CMC for a commercial AC power supply AC.

A full-wave rectification smoothing circuit is connected to the commercial AC power supply AC at the next stage to the noise filter. The full wave rectification smoothing circuit is formed from a bridge rectification circuit Di and a smoothing capacitor Ci.

The full wave rectification smoothing circuit receives the commercial AC power supply AC as an input thereto and performs a full wave rectification operation, and consequently, a rectified smoothed voltage Ei (DC input voltage) is obtained across the smoothing capacitor Ci. The rectified smoothed voltage Ei in this instance has a level equal to an AC input voltage VAC of the commercial AC power supply AC.

A current resonance type converter receives the DC input voltage as an input thereto to perform switching (switching on and off). The current resonance type converter includes switching elements Q1 and Q2 each in the form of a MOS-FET connected in a half bridge connection in such a manner as seen in FIG. 1. Damper diodes DD1 and DD2 are connected in parallel between the drain-source of the switching elements Q1 and Q2, respectively. The anode and the cathode of the damper diode DD1 are connected to the source and the drain of the switching element Q1, respectively. Similarly, the anode and the cathode of the damper diode DD2 are connected to the source and the drain of the switching element Q2, respectively. The damper diodes DD1 and DD2 serve as body diodes provided for the switching elements Q1 and Q2, respectively.

A primary side partial resonance capacitor Cp is connected in parallel between the drain-source of the switching element Q2. The capacitance of the primary side partial resonance capacitor Cp and the leakage inductance Li of a primary winding N1 cooperatively form a parallel resonance circuit (partial voltage resonance circuit). Thus, a partial voltage resonance operation of the parallel resonance circuit is obtained wherein voltage resonance occurs only when the switching elements Q1 and Q2 are turned off.

An oscillation and driving circuit 2 is provided in order to switching drive the switching elements Q1 and Q2. The oscillation and driving circuit 2 includes an oscillation circuit and a driving circuit and may be formed, for example, a general purpose IC. The oscillation circuit of the oscillation and driving circuit 2 generates an oscillation signal of a required frequency. Meanwhile, the driving circuit of the oscillation and driving circuit 2 makes use of the oscillation signal to produce a switching driving signal which is a gate voltage for switching driving a MOS-FET and applies the switching driving signal to the gates of the switching elements Q1 and Q2. Consequently, the switching elements Q1 and Q2 perform a switching operation such that they are successively turned on/off alternately in accordance with a switching frequency defined by the cycle of the switching driving signal.

An insulating converter transformer PIT is provided for transmitting the switching output of the switching elements Q1 and Q2 to the secondary side.

The primary winding N1 of the insulating converter transformer PIT is connected at an end thereof to a node (switching output point) between the source of the switching element Q1 and the drain of the switching element Q2 through a series connection of a primary side series resonance capacitor C1 so that the switching output may be transmitted. The primary winding N1 is connected at the other end thereof to the primary side ground.

Figure 2:
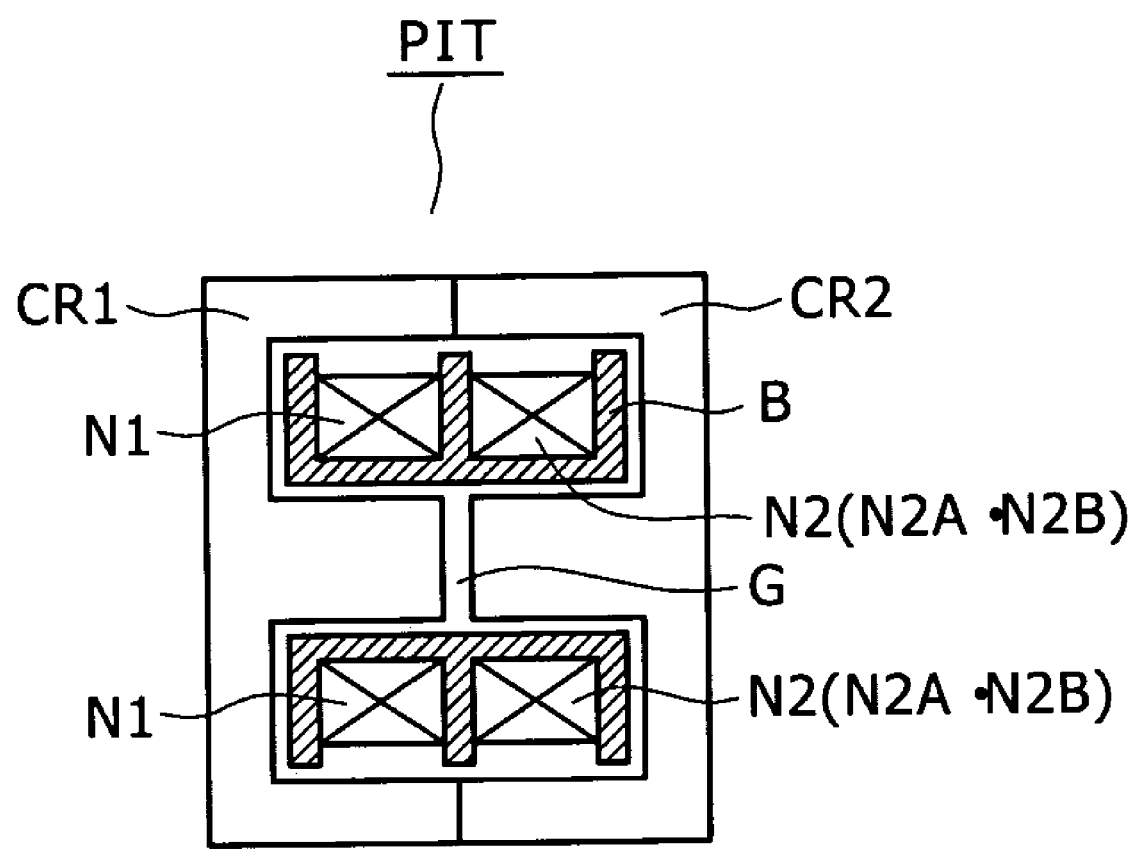
FIG. 2 is a sectional view showing an example of a structure of an insulating converter transformer provided in the switching power supply circuit of FIG. 1.

The insulating converter transformer PIT has such a structure as shown in a sectional view of FIG. 2.

Referring to FIG. 2, the insulating converter transformer PIT includes an EE type core (EE-shaped core) which is formed from a combination of E type cores CR1 and CR2 made of a ferrite material and having magnetic legs opposing to each other.

The insulating converter transformer PIT further includes a bobbin B formed, for example, from a resin material and having such a divided shape that a primary side winding receiving portion and a secondary side winding receiving portion are provided independently of each other. The primary winding N1 is wound on one of the winding receiving portions of the bobbin B. Meanwhile, a secondary winding N2 (in this instance, a secondary winding N2A and another secondary winding N2B) is wound on the other winding receiving portion. The bobbin B having the primary winding N1 and the secondary winding N2 wound thereon in this manner is attached to the EE type core (E type cores CR1 and CR2) such that the primary side winding and the secondary side winding are wound in the different winding receiving areas from each other on the inner magnetic leg of the EE type core. The general structure of the insulating converter transformer PIT is obtained in this manner.

Further, a gap G is formed in the inner magnetic leg of the EE type core in such a manner as seen in FIG. 2. The gap G in this instance is set, for example, to a gap length of approximately 1.6 mm so as to obtain a loose coupling state wherein the coupling coefficient k between the primary side and the secondary side is, for example, k=0.65 or less. The gap G can be formed by forming the inner magnetic legs of the E type cores CR1 and CR2 shorter than the other two outer magnetic legs of each of the E type cores CR1 and CR2.

Figure 14:
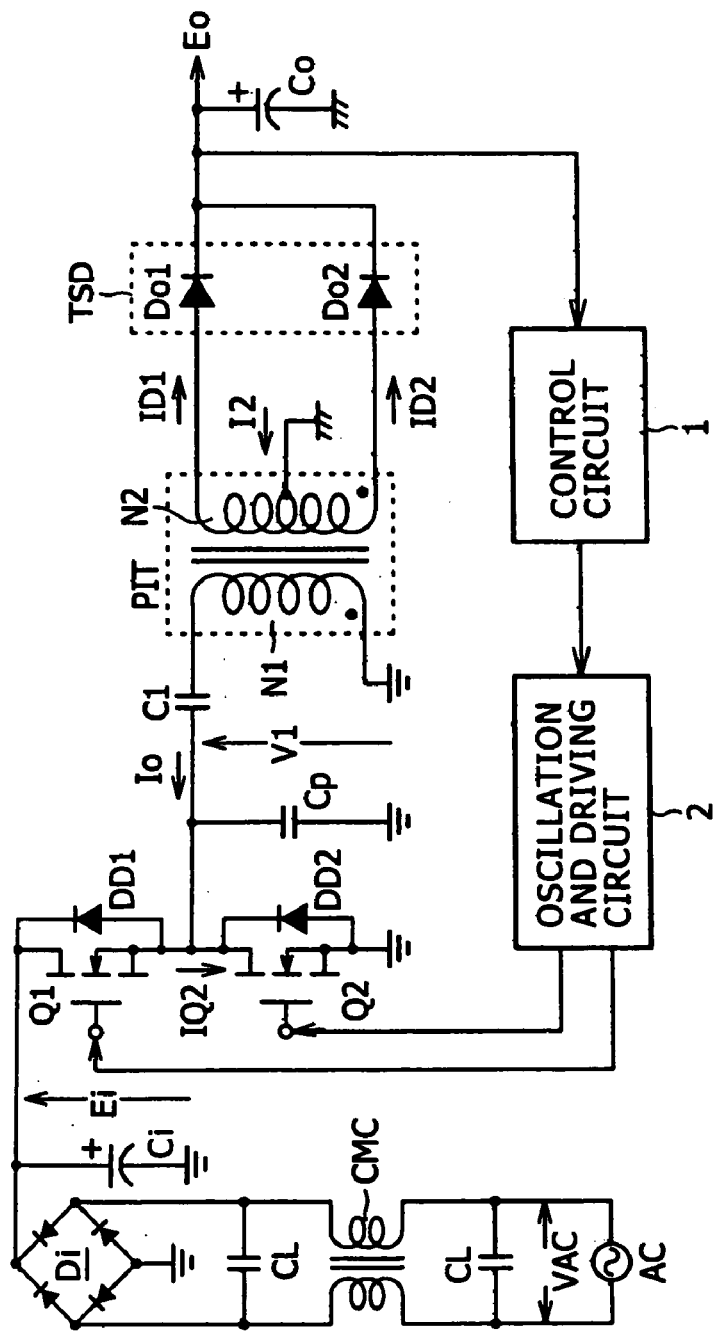
FIG. 14 is a circuit diagram showing an example of a configuration of a conventional power supply circuit.
Figure 15:
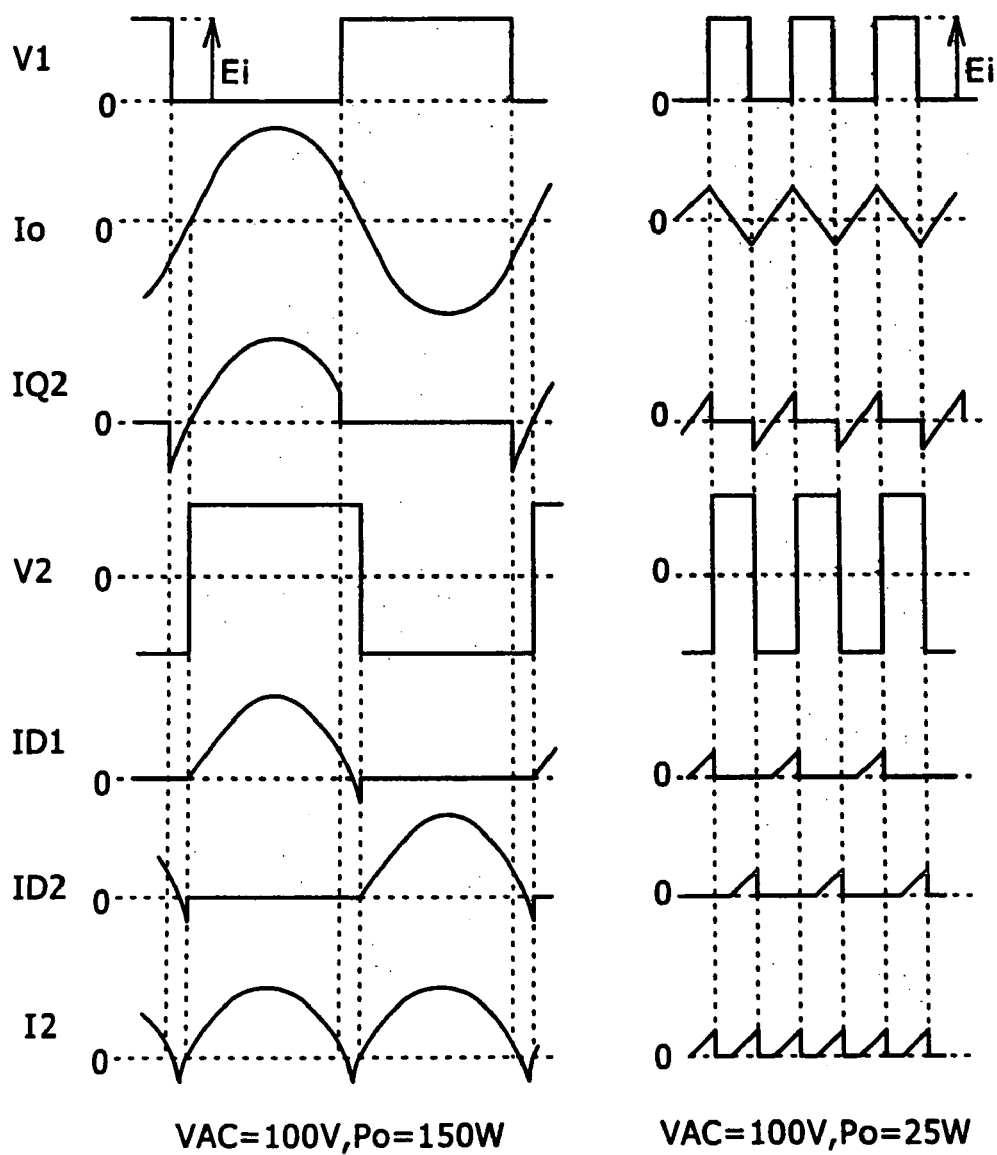
FIG. 15 is a waveform diagram illustrating operation of several components of the power supply circuit of FIG. 14.
Figure 16:
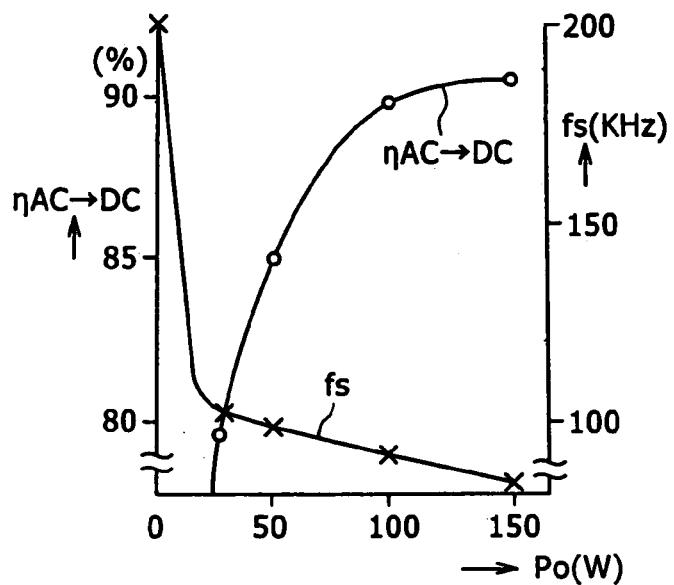
FIG. 16 is a diagram illustrating the characteristics of the switching frequency and the AC→DC power conversion efficiency of the power supply circuit of FIG. 14 with respect to the load variation.

Incidentally, where a conventional power supply circuit including a current resonance type converter beginning with the power supply circuit described hereinabove with reference to FIG. 14 is configured such that a comparatively low level of, for example, approximately 25 V is obtained as the level of the secondary side DC output voltage Eo, the winding ratio of the primary winding N1 and the secondary winding N2 is set so that the number of turns of the secondary winding N2 is considerably smaller. In the conventional configuration wherein the number of turns of the secondary winding N2 is set considerably smaller than that of the primary winding N1 in this manner, the gap formed in the core of the insulating converter transformer PIT is set, for example, to 1.0 mm or less so that a coupling coefficient k of k=0.75 or more is obtained.

In other words, as a configuration for obtaining a comparatively low level as the level of the secondary side DC output voltage Eo similarly, in the present embodiment, the coupling degree between the primary side and the secondary side of the insulating converter transformer PIT is set lower than that in the conventional power supply circuit.

Referring back to FIG. 1, in the insulating converter transformer PIT, the structure described above with reference to FIG. 2 allows the primary winding N1 to have a predetermined leakage inductance L1. Further, as described hereinabove, the primary winding N1 and the primary side series resonance capacitor C1 are connected in series. Accordingly, a series resonance circuit (primary side series resonance circuit) is formed from the leakage inductance L1 of the primary winding N1 and the capacitance of the primary side series resonance capacitor C1.

Further, the primary side series resonance circuit is connected to the switching output point of the switching elements Q1 and Q2, and consequently, the switching output of the switching elements Q1 and Q2 is transmitted to the primary side series resonance circuit. The primary side series resonance circuit performs a resonance operation with the switching output transmitted thereto thereby to make the operation of the primary side switching converter as that of the current resonance type.

Incidentally, according to the description above, an operation of the current resonance type by the primary side series resonance circuit (L1-C1) and a partial voltage resonance operation by primary side partial voltage resonance circuit (Cp//L1) described hereinabove are obtained with the primary side switching converter shown in FIG. 1.

In other words, the primary side of the power supply circuit shown in FIG. 1 is configured such that a resonance circuit which makes the primary side switching converter as that of the resonance type is combined with another resonance circuit. A switching converter formed from a combination of two resonance circuits in this manner is hereinafter referred to as "composite resonance type converter".

An alternating voltage is excited (induced) in the secondary winding N2 of the insulating converter transformer PIT in response to the switching output transmitted to the primary winding N1.

In this instance, the secondary winding N2 is formed from two windings including a secondary winding N2A and another secondary winding N2B as seen in FIG. 1. A secondary side series resonance capacitor C2A and another secondary side series resonance capacitor C2B are connected in series on one end side thereof to the secondary winding N2A and the secondary winding N2B, respectively.

Consequently, a secondary side series resonance circuit is formed from the capacitance of the secondary side series resonance capacitor C2A and the leakage inductance L2A of the secondary winding N2A or the capacitance of the secondary side series resonance capacitor C2B and the leakage inductance L2B of the secondary winding N2B. In other words, in the present embodiment, a series resonance circuit is formed on each of the primary and secondary sides of the insulating converter transformer PIT.

It is to be noted that, in this instance, an equal number of turns are wound on the secondary winding N2A and the secondary winding N2B. Further, also the secondary side series resonance capacitor C2A and the secondary side series resonance capacitor C2B have an equal capacitance.

A full wave rectification circuit is connected to each of the secondary side series resonance circuits (L2A-C2A, L2B-C2B). The full wave rectification circuit is formed from rectification diodes Do1A to Do4A or rectification diodes Do1B to Do4B connected in such a manner as seen in FIG. 1. A single smoothing capacitor Co is provided commonly for the two bridge rectification circuits in such a manner as seen in FIG. 1. Consequently, a full wave rectification smoothing circuit is formed from the bridge rectification circuit of the secondary winding N2A side and the smoothing capacitor Co, and another full wave rectification smoothing circuit is formed from the bridge rectification circuit of the secondary winding N2B side and the smoothing capacitor Co.

In the full wave rectification circuit, within one of two half cycles of the alternating voltages excited in the secondary winding N2A and the secondary winding N2B, the set of the rectification diodes [Do1, Do4] of each of the bridge rectification circuit conducts to charge the rectification current commonly into the smoothing capacitor Co. Within the other half cycle of the alternating voltages excited in the secondary winding N2A and the secondary winding N2B, the set of the rectification diodes [Do2, Do3] conducts to charge the rectification current commonly into the smoothing capacitor Co.

Consequently, a level corresponding to the alternating voltage level excited in the secondary winding N2A and the secondary winding N2B is obtained as a voltage across the smoothing capacitor Co (secondary side DC output voltage Eo).

It is to be noted that, in the bridge rectification circuit from which each of the full wave rectification circuits is formed in the present embodiment, a twin Schottky barrier diode (TSD) is selectively used for each of, for example, the sets of rectification diodes [Do1, Do3] and [Do2, Do4] from among the rectification diodes Do1 to Do4 which perform a rectification operation within different half cycles from each other. In particular, as seen from frameworks each indicated by a broken line in FIG. 1, in the bridge rectification circuit connected to the secondary winding N2A side, a twin Schottky barrier diode TSD1A is selectively used for the rectification diode Do1A and the rectification diode Do3A. Meanwhile, a twin Schottky barrier diode TSD2A is selectively used for the rectification diode Do2A and the rectification diode Do4A.

Similarly, also on the secondary winding N2B side, a twin Schottky barrier diode TSD1B is selectively used for the rectification diodes Do1B and Do3B while another twin Schottky barrier diode TSD2B is selectively used for the rectification diodes Do2B and Do4B.

It is to be noted that naturally the rectification diodes Do1 to Do4 may individually be formed from separate parts.

The secondary side DC output voltage Eo obtained in such a manner as described above is supplied to a load not shown and is further branched and inputted as a detection voltage for a control circuit 1 hereinafter described.

Further, since each of the full wave rectification circuits performs a rectification smoothing operation for a resonance output of the respective secondary side series resonance circuit, also the secondary side rectification operation is that of the current resonance type. Specifically, the rectification current waveform includes a sinusoidal waveform with the resonance frequency of the secondary side series resonance circuit.

According to the description above, the switching power supply circuit of the present embodiment includes the primary side series resonance circuit (L1-C1) and the primary side partial voltage resonance circuit (L1//Cp) on the primary side and includes the secondary side series resonance circuit (L2-C2) on the secondary side.

As described hereinabove, while a switching converter formed from two resonance circuits including a series resonance circuit and a partial voltage resonance circuit such as those on the primary side is referred to as composite resonance type converter, a switching converter formed from a combination of three of more resonance circuits as in the case of the present embodiment is hereinafter referred to as multiple resonance type converter.

The control circuit 1 is provided to stabilize the secondary side DC output voltage Eo in accordance with the switching frequency controlling method.

The control circuit 1 in this instance supplies a detection output representative of the level variation of the secondary side DC output voltage Eo, which is inputted a detection input thereto, to the oscillation and driving circuit 2. The oscillation and driving circuit 2 drives the switching elements Q1 and Q2 so as to vary the switching frequency in response to the detection output of the control circuit 1 inputted thereto. To this end, the frequency of the oscillation signal to be produced by the internal oscillation circuit is varied.

As the switching frequency of the switching elements Q1 and Q2 is varied, the resonance impedance of the primary side series resonance circuit varies, and the electric energy to be transmitted from the primary winding N1 to the secondary winding N2 side of the insulating converter transformer PIT varies thereby to stabilize the level of the secondary side DC output voltage Eo.

Although details are hereinafter described, according to the switching frequency controlling method used in the power supply circuit of the present embodiment, a frequency range higher than an intermediate resonance frequency fo which depends upon the resonance frequency fo1 of the primary side series resonance circuit and the resonance frequency fo2 of the secondary side series resonance circuit is set as a variation range for the switching frequency. In other words, an upper side controlling method is adopted.

As a general matter, a series resonance circuit exhibits the lowest resonance impedance at the resonance frequency thereof. From this, where the upper side controlling method based on the resonance frequency of a series resonance circuit is adopted as in the present embodiment, the resonance impedance is set higher as the switching frequency fs becomes higher.

Accordingly, when the load is inclined to become heavier and the secondary side DC output voltage Eo drops, the switching frequency is controlled so as to become lower. This decreases the resonance impedance and increases the power transmission amount from the primary side to the secondary side, and consequently, the secondary side DC output voltage Eo rises.

On the other hand, when the load is inclined to become lighter and the secondary side DC output voltage Eo rises, the switching frequency is controlled so as to become higher. This increases the resonance impedance and decreases the power transmission amount, and consequently, the secondary side DC output voltage Eo drops. The switching frequency is varied to stabilize the secondary side DC output voltage Eo in this manner.

In the power supply circuit of FIG. 1 having the configuration described above, the series resonance circuits (primary side series resonance circuit (L1-C1) and secondary side series resonance circuit (L2-C2)) are provided on the primary side and the secondary side. Further, as described hereinabove with reference to FIG. 2, the coupling coefficient between the primary side and the secondary side of the insulating converter transformer PIT is set equal to or lower than a predetermined value.

In the present embodiment, since such a configuration as described above is adopted, the power supply circuit based on the current resonance type converter can be practically used as a power supply circuit ready for the wide range which operates in response to both of commercial AC power supply inputs of the AC 100 V type and the AC 200 V type. This is described in detail below.

Figure 3:
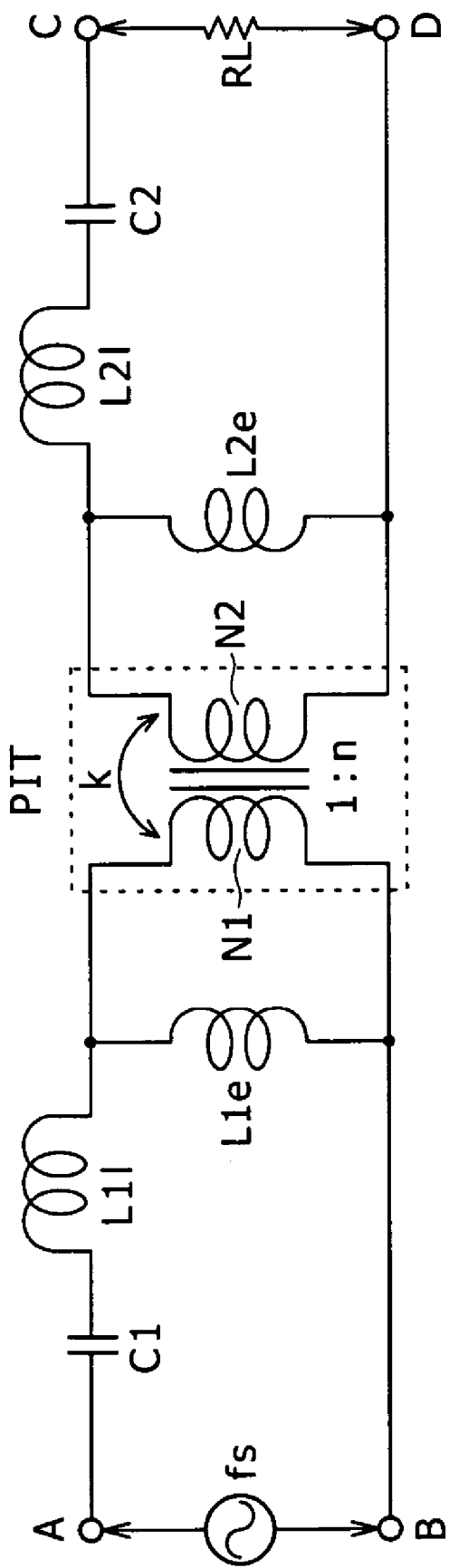
FIG. 3 is an equivalent circuit diagram of the power supply circuit of FIG. 1 where it is regarded as an electromagnetic coupling resonance circuit.

FIG. 3 shows an equivalent circuit to the power supply circuit of the present embodiment shown in FIG. 1 where the power supply circuit is studied from the relationship between the primary side series resonance circuit and the secondary side series resonance circuit.

Referring to FIG. 3, an insulating converter transformer PIT is shown wherein a primary winding N1 and a secondary winding N2 having predetermined numbers of turns whose winding ratio is 1:n are wound. Further, in FIG. 3, the coupling degree between the primary side and the secondary side of the insulating converter transformer PIT is indicated by the coupling coefficient k.

The primary side of the insulating converter transformer PIT includes a leakage inductance L1$l$ of the primary winding N1 and an exciting inductance L1$e$ of the primary winding N1. Meanwhile, the secondary side of the insulating converter transformer PIT includes a leakage inductance L2$l$ of the secondary winding N2 and an exciting inductance L2$e$ of the secondary winding N2.

In the equivalent circuit diagram shown in FIG. 3, an AC signal (frequency signal) of the switching frequency fs is inputted to the primary side of the insulating converter transformer PIT. In other words, the switching output of the primary side switching converter (switching elements Q1 and Q2) is inputted.

Further, on the primary side of the insulating converter transformer PIT, the AC input of the switching frequency fs is supplied to the primary side series resonance circuit. The primary side series resonance circuit can be regarded as a circuit wherein the primary side series resonance capacitor C1 and the leakage inductance L1 are connected in series to the primary winding N1 and the exciting inductance L1$e$ is connected in parallel to the primary winding N1 as seen in FIG. 3.

Also the secondary side series resonance circuit of the insulating converter transformer PIT is considered to be a circuit wherein the secondary side series resonance capacitor C2 and the leakage inductance L2$l$ are connected in series to the secondary winding N2 and the exciting inductance L2$e$ is connected in parallel to the secondary winding N2 similarly. Further, in FIG. 3, an output of the secondary side series resonance circuit formed in this manner is outputted to a load RL. The load RL here is circuits and loads following the secondary side full wave rectification circuit.

In the equivalent circuit of FIG. 3 having such a connection scheme as described above, where the coupling coefficient of the insulating converter transformer PIT is represented by k and the self inductance of the primary winding N1 is represented by L1, the leakage inductance L1$l$ of the primary winding N1 can be represented by $$L1l=(1-k^2)L1 \quad (1)$$

Meanwhile, the exciting inductance L1$e$ of the primary winding N1 can be represented by $$L1e=k^2 \times L1 \quad (2)$$

Similarly, where the self inductance of the secondary winding N2 is represented by L2, the leakage inductance L2$l$ and the exciting inductance L2$e$ of the secondary winding N2 can be represented respectively by:

$$L2l=(1-k^2)L2 \quad (3)$$

$$L2e=k^2 \times L2 \quad (4)$$

In the equivalent circuit shown in FIG. 3, the primary side series resonance circuit is provided on the primary side and the secondary side series resonance circuit is provided on the secondary side through electromagnetic induction of the insulating converter transformer PIT. Accordingly, the circuit shown in FIG. 3 can be considered such that a coupling type resonance circuit by electromagnetic coupling is formed. Therefore, the constant voltage controlling characteristic of the secondary side DC output voltage Eo differs depending upon the coupling degree (coupling coefficient k) of the insulating converter transformer PIT. This is described with reference to FIG. 4.

Figure 4:
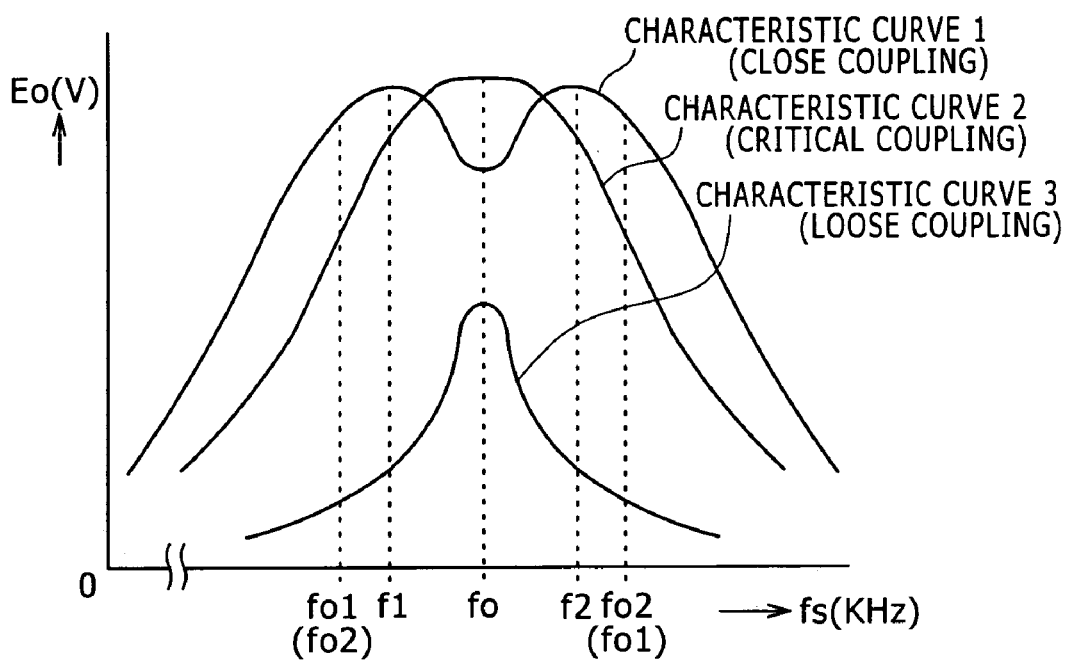
FIG. 4 is a diagram illustrating a constant voltage control characteristic of the power supply circuit of FIG. 1.

FIG. 4 illustrates an output characteristic of the equivalent circuit described hereinabove with reference to FIG. 3 with respect to an input (switching frequency signal). In other words, FIG. 4 illustrates the controlling characteristic of the secondary side DC output voltage Eo as a relationship to the switching frequency fs. In FIG. 4, the axis of abscissa indicates the switching frequency and the axis of ordinate indicates the level of the secondary side DC output voltage Eo.

It is to be noted that, while, in FIG. 4, the resonance frequency fo1 of the primary side series resonance circuit and the resonance frequency fo2 of the secondary side series resonance circuit are shown in an overlapping relationship with each other, this represents that a similar characteristic is obtained irrespective of the set values of the resonance frequency fo1 and the resonance frequency fo2.

Here, it is assumed that the coupling degree of the insulating converter transformer PIT is set to that of a close coupling state represented by the coupling coefficient k=1. Thus, the leakage inductance L1$l$ of the primary winding N1 and the leakage inductance L2$l$ of the secondary winding N2 in this instance can be represented, by substituting k=1 into the expressions (1) and (3) given hereinabove, by $$L1l=L2l=0 \quad (5)$$

In other words, since the insulating converter transformer PIT has a close coupling state, the expression (5) represents that the primary winding N1 and the secondary winding N2 have no leakage inductance.

The constant voltage controlling characteristic in a state wherein the primary side and the secondary side of the insulating converter transformer PIT have a close coupling in this manner is a double-humped characteristic. In the double-humped characteristic, the secondary side DC output voltage Eo exhibits a peak at each of different frequencies f1 and f2 different from the resonance frequency fo1 of the primary side series resonance circuit and the resonance frequency fo2 of the secondary side series resonance circuit. Here, the frequency f1 is represented by $$f1=fo/\sqrt{1+k} \quad (6)$$

while the frequency f2 is represented by $$f2=fo/\sqrt{1-k} \quad (7)$$

where fo is an intermediate frequency between the resonance frequency fo1 of the primary side series resonance circuit and the resonance frequency fo2 of the secondary side series resonance circuit. The frequency fo depends upon the impedance of the primary side and the impedance of the secondary side as well as the common impedance (mutual coupling inductance M) between the primary side and the secondary side.

The mutual coupling inductance M is represented by $$M = k\sqrt{L1 \times L2} \tag{8}$$

On the other hand, if the coupling coefficient k described hereinabove is gradually decreased from the state of k=1, that is, if the loose coupling degree is gradually increased from the close coupling state, then the characteristic curve 1 shown in FIG. 4 exhibits such a variation that it gradually loses the tendency of the double-humped characteristic and becomes flattened in the proximity of the intermediate resonance frequency fo. Then, when the coupling coefficient k drops to a certain level, a critical coupling state is reached. In the critical coupling state, the tendency of the double-humped characteristic is lost fully as shown as a characteristic curve 2 which indicates a flattened shape around the intermediate resonance frequency fo.

If the coupling coefficient k is further decreased from the critical coupling state to strengthen the loose coupling degree, then a single-humped characteristic which exhibits a peak only at the intermediate resonance frequency fo is obtained as shown as a characteristic curve 3 of FIG. 4. Where the characteristic curve 3 is compared with the characteristic curves 1 and 2, it can be seen that, although the peak level of the characteristic curve 3 is lower than those of the characteristic curves 1 and 2, the characteristic curve has a steeper inclination as a shape of a curve similar to a curve of a quadratic function.

The insulating converter transformer PIT in the present embodiment is set to a loose coupling state wherein the coupling coefficient k is $k \leq 0.65$. The setting of the coupling coefficient k provides an operation of the single-humped characteristic indicated by the characteristic curve 3.

Figure 17:
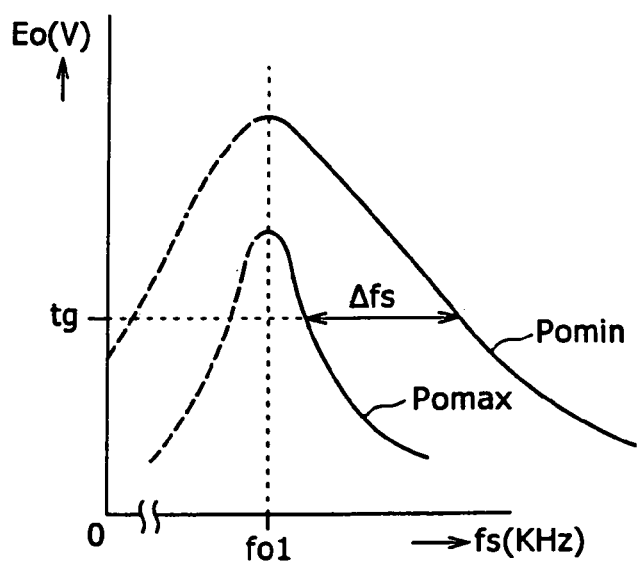
FIG. 17 is a diagram illustrating a constant voltage control characteristic of the power supply circuit of FIG. 14.

Here, if the single-humped characteristic illustrated in FIG. 4 and the constant voltage controlling characteristic of the composite resonance type converter of the power supply circuit (FIG. 14) of the related art described hereinabove with reference to FIG. 17 are actually compared with each other, then the characteristic illustrated in FIG. 17 has a considerably more moderate inclination in quadratic function than the characteristic illustrated in FIG. 4.

In the power supply circuit shown in FIG. 14, since the characteristic illustrated in FIG. 17 is moderate in curve as described above, the necessary control range for the switching frequency for performing constant voltage control of the secondary side DC output voltage Eo is, for example, even under the condition that the power supply circuit is ready for a single range, that the switching frequency fs is fs=80 kHz to 200 kHz or more and the rate $\Delta fs$ of variation of the switching frequency fs is $\Delta fs$=120 kHz or more. Therefore, as described hereinabove, it is very difficult to make the power supply circuit ready for the wide range only by means of the constant voltage control by switching frequency control.

Figure 5:
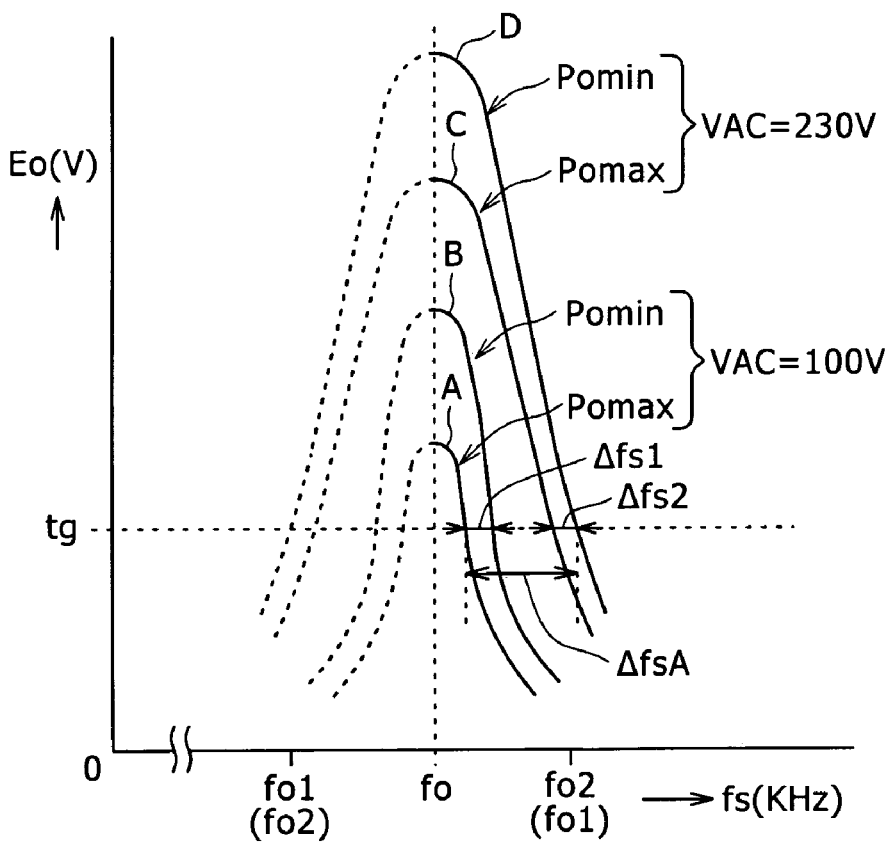
FIG. 5 is a diagram illustrating a switching frequency control range (necessary controlling range) with respect to an AC input voltage condition and load variation in constant voltage controlling operation of the power supply circuit of FIG. 1.

In contrast, according to the constant voltage control characteristic in the present embodiment, since it is a single-humped characteristic indicated by the characteristic curve 3 of FIG. 4, such a constant voltage controlling operation as illustrated in FIG. 5 is obtained.

Referring to FIG. 5, there are shown characteristic curves A and B of the power supply circuit of the present embodiment shown in FIG. 1 when the load power is the maximum load power Pomax and the minimum load power Pomin where the AC input voltage VAC is VAC=100 V (AC 100 V type) and characteristic curves C and D when the load power is the maximum load power Pomax and the minimum load power Pomin where the AC input voltage VAC is VAC=230 V (AC 200 V type), respectively.

As can be recognized from FIG. 5, when the AC input voltage VAC is VAC=100 V corresponding to an input of the AC 100 V type, the variation control range (necessary control range) of the switching frequency necessary to fix the secondary side DC output voltage Eo to a required rated level tg is represented by $\Delta fs1$. In other words, the variation control range (necessary control range) $\Delta fs1$ ranges from the switching frequency fs at which the characteristic curve A exhibits the rated level tg to the switching frequency fs at which the characteristic curve B exhibits the rated level tg.

On the other hand, when the AC input voltage VAC is VAC=230 V corresponding to an input of the AC 200 V type, the variation control range (necessary control range) of the switching frequency necessary to fix the secondary side DC output voltage Eo to the required rated level tg is represented by $\Delta fs2$. In other words, the variation control range (necessary control range) $\Delta fs2$ ranges from the switching frequency fs at which the characteristic curve C exhibits the rated level tg to the switching frequency fs at which the characteristic curve D exhibits the rated level tg.

As described hereinabove, the single-humped characteristic which is a controlling characteristic of the secondary side DC output voltage Eo in the present embodiment is considerably steeper as a curve of a quadratic function than that of the controlling characteristic described hereinabove with reference to FIG. 17.

Therefore, the variation control ranges (necessary control ranges) $\Delta fs1$ and $\Delta fs2$ when the AC input voltage VAC is VAC=100 V and VAC=230 V are reduced considerably when compared with the variation control range (necessary control range) $\Delta fs$ illustrated in FIG. 17. For example, a result was obtained that the variation control ranges (necessary control ranges) $\Delta fs1$ and $\Delta fs2$ as actually measured were reduced to approximately 1/10 or less with respect to the variation control range (necessary control range) $\Delta fs$ of FIG. 17 actually obtained.

Further, also the frequency variation range ($\Delta fsA$) from the lowest switching frequency of the necessary control range $\Delta fs1$ (switching frequency fs at which the characteristic curve A exhibits the level tg) to the highest switching frequency of the variation control range $\Delta fs2$ (switching frequency fs at which the characteristic curve D exhibits the level tg) is reduced considerably when compared with the variation control range (necessary control range) $\Delta fs$ illustrated in FIG. 17.

Here, the actual frequency variation range $\Delta fsA$ in the power supply circuit of the present embodiment shown in FIG. 1 is included sufficiently within the variation range of the switching frequency for which a switching driving IC (oscillation and driving circuit 2) in a present situation is ready. In particular, according to the power supply circuit shown in FIG. 1, the switching frequency can be variably controlled actually within the frequency variation range $\Delta fsA$. This signifies that the power supply circuit shown in FIG. 1 can stabilize the secondary side DC output voltage Eo also with respect to any of commercial AC power supply inputs of the AC 100 V type and the AC 200 V type. In other words, the power supply circuit shown in FIG. 1 can be ready for the wide range only through switching frequency control.

Incidentally, a coupling type resonance circuit by electromagnetic coupling is known as a technique for expanding the amplification bandwidth of an amplification circuit formed from transistors in a communication technique, for example, like an intermediate frequency transformer amplifier. However, while, in such a field as just described, a double-humped characteristic by loose coupling or a flat characteristic by critical coupling is utilized, a single-humped characteristic by loose coupling is not utilized. In the present embodiment, it is considered that, in such a technique of a coupling type resonance circuit by electromagnetic coupling, a single-humped characteristic by loose coupling which has not been adopted in the field of communication techniques is utilized positively in the field of resonance type switching converters. Consequently, it is possible to reduce the variation range (necessary control range) of the switching frequency necessary to stabilize the secondary side DC output voltage Eo and utilize only the constant voltage control in the switching frequency control to make the power supply circuit ready for the wide range.

It is to be noted that, as the degree of loose coupling between the primary side and the secondary side of the insulating converter transformer PIT gradually increases, generally the power loss by the insulating converter transformer PIT is inclined to increase, and also the power conversion efficiency drops as much. However, in the present embodiment, a characteristic of a power conversion efficiency sufficient for practical use is obtained as hereinafter described. This arises from the fact that a series resonance circuit (secondary side series resonance circuit) is formed also on the secondary side.

In particular, where a secondary side series resonance circuit is provided, the power of the secondary side DC output voltage Eo can be supplied including an increasing amount of energy obtained by a resonance operation of the secondary side series resonance circuit, and this compensates for the decrease of the efficiency by the loose coupling.

Incidentally, in the present embodiment, a series resonance circuit is formed on both of the primary side and the secondary side as described hereinabove and the coupling coefficient between the primary side and the secondary side is set to a predetermined level or less to achieve a configuration ready for the wide range.

However, it is known that, in this instance, if nothing is taken into consideration with regard to the setting of the resonance frequencies of the resonance circuits on the primary side and the secondary side, then favorable reduction of the necessary control range Δfs is not achieved or a sufficient power conversion efficiency is not obtained.

Therefore, in the present embodiment, from a result of an experiment conducted with regard to the setting of the resonance frequencies, it is decided to set the resonance frequency fo2 of the secondary side series resonance circuit in the following manner with respect to the resonance frequency fo1 of the primary side series resonance circuit.

In particular, the resonance frequency fo2 is set to approximately 0.9 to 1.1 times the resonance frequency fo1.

Here, a relationship between the setting of the resonance frequency fo1 and the resonance frequency fo2 and the necessary control range Δfs and power conversion efficiency is described.

First, in a condition wherein the resonance frequency fo1 and the resonance frequency fo2 are set within a certain frequency range, it is known that the waveform of primary side series resonance current Io flowing to the primary side series resonance circuit exhibits a substantially M shape in the proximity of a peak thereof which appears in every half cycle.

Also it is known that the level of such an M-shaped peak waveform of the primary side series resonance current Io as just described varies depending upon the set values of the resonance frequencies (fo1, fo2).

Figure 6A:
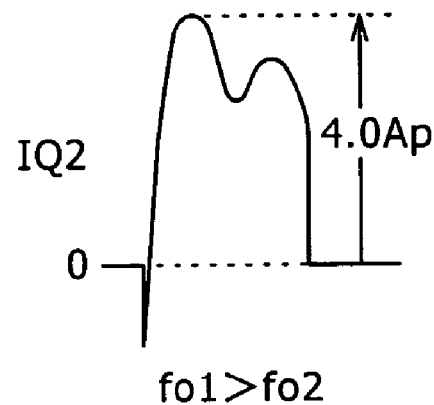
FIGS. 6A to 6C are waveform diagrams illustrating a relationship among a resonance frequency of a primary side series resonance circuit, a setting value of a resonance frequency of a secondary side series resonance circuit and switching current in the power supply circuit of FIG. 1.
Figure 6B:
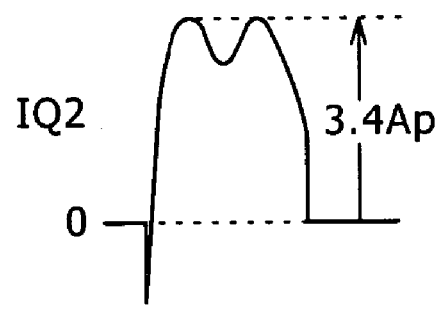
Figure 6C:
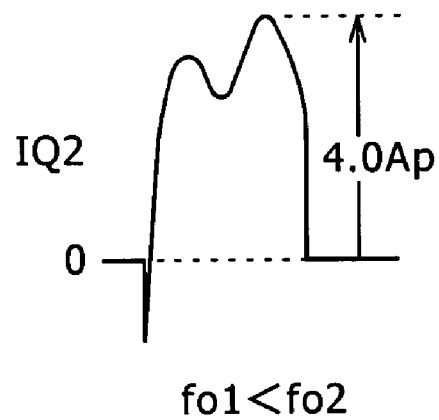

Here, the waveform of the switching current IQ2 of the switching element Q2 obtained where the primary side series resonance current Io has a substantially M-shaped waveform is shown for different set values of the resonance frequencies in FIGS. 6A to 6C.

In particular, FIG. 6A shows the waveform of the switching current IQ2 where the resonance frequencies are set so as to have a relationship of fo1>fo2. Meanwhile, FIG. 6B shows the waveform of the switching current IQ2 where the resonance frequency fo2 is set to approximately 0.9 to 1.1 times the resonance frequency fo1, that is, where fo1≈fo2. Further, FIG. 6C shows the waveform of the switching current IQ2 where the resonance frequencies fo1 and fo2 are set to fo1<fo2.

It is described here for the confirmation that the setting of fo1>fo2 in FIG. 6A is given under the condition of fo2<fo1× 0.9. Meanwhile, the setting of fo1<fo2 in FIG. 6C is given under the condition of fo2>fo1×1.1.

As can be seen from FIGS. 6A to 6C, where the peak waveform of the primary side series resonance current Io has a substantially M-shaped, also the waveform of the switching current IQ2 has a substantially M shape around a peak thereof. This can be recognized from the fact that the primary side series resonance current Io is a composite factor of switching current by the switching elements Q1 and Q2.

Further, it can be seen in FIG. 6A that the front half of the substantially M-shaped waveform has a higher level. On the other hand, in the waveform of FIG. 6C, the rear half has a higher level. In other words, where the resonance frequency fo1 and the resonance frequency fo2 are set so as to satisfy fo1>fo2 or fo1<fo2, the peak levels of the substantially M-shaped waveform of the switching current IQ2 (that is, the primary side series resonance current Io) have some one-sidedness.

On the other hand, it can be seen that, in the waveform of FIG. 6B wherein the resonance frequencies fo1 and fo2 are set so as to satisfy fo1≈fo2, the peak levels of the substantially M-shaped waveform have a substantially equal level and have no one-sidedness. In other words, in this instance, while, according to the setting of FIG. 6A or 6C, one of the peak levels is higher by such one-sidedness as described above, the peak levels according to the setting of FIG. 6B are suppressed because they are substantially equal to each other. This is indicated also from that, while the peak level of the switching current IQ2 in FIGS. 6A and 6C is 4.0 Ap at a position rising as a result of the one-sidedness described above, the peak levels of the switching current IQ2 in FIG. 6B are 3.4 Ap and equal to each other.

Here, where the peak level of the switching current IQ2 (that is, the peak level of the switching current IQ2) increases, the switching loss by the switching elements Q1 and Q2 increases, resulting in deterioration of the power conversion efficiency. Further, since such M-shaped peaks of the primary side series resonance current Io as described above appear, for example, as a variation component of the secondary side DC output voltage Eo, the increase of the same makes a factor of increase of the necessary control range (Δfs) in the switching frequency control.

From this, according to the embodiment wherein the resonance frequencies fo1 and fo2 are set to fo1≈fo2 with which the peak levels of the primary side series resonance current Io are lowest as seen in FIG. 6B, reduction of the necessary control range Δfs and enhancement of the power conversion efficiency can be achieved efficiently.

It is to be noted that, while the resonance frequency fo2 described above is set to fo2=fo1×approximately 0.9 to 1.1, as a relationship between the resonance frequency fo1 and the resonance frequency fo2 when it is tried to achieve such an effect as described above, the resonance frequencies fo1 and fo2 may be set to such values with which equal peak levels are obtained with M-shaped peak waveforms appearing with the primary side series resonance current Io.

Incidentally, as described hereinabove with reference to FIG. 1, in the present embodiment, the two secondary windings N2A and N2B are wound as the secondary winding N2, and the common secondary side DC output voltage Eo is produced based on the two outputs of the secondary winding N2.

The reason why such a configuration as just described above is adopted is that it is intended to reduce the peak level of the rectification current on the secondary side so as to make it possible for the power supply circuit to be ready for a heavy load condition.

For example, if it is assumed to wind only one secondary winding N2 in the circuit shown in FIG. 1, then in order to supply the secondary side rectification current to an equal load, it is necessary to make the secondary side rectification current level higher than that where the configuration shown in FIG. 1 is used as it is. This increases the conducting loss of the rectification elements and deteriorates the power conversion efficiency.

Further, since the peak level of the secondary side rectification circuit increases, the current withstanding level of the rectification elements on the secondary side must be raised. For example, if the secondary winding N2B and the succeeding rectification circuit in the configuration shown in FIG. 1 are omitted, then the twin Schottky barrier diodes TSD1 and TSD2 which form the bridge rectification circuit must be formed from a high current withstanding device of, for example, 40 V/30 A. Where such a high current withstanding device as just described is used, also the device size is great as much, and this gives rise to increase of the scale of the circuit.

It is to be noted that, according to an experiment, where the circuit shown in FIG. 1 was modified so as to omit the secondary winding N2B and the twin Schottky barrier diodes TSD1B and TSD2B, the peak level of secondary winding current I2 was 32 Ap-p under the conditions of the AC input voltage VAC=100 V and the load power Po=150 W (secondary side DC output voltage Eo=25 V and load current=6 A). Also a result was obtained that the AC→DC power conversion efficiency ηAC→DC was ηAC→DC=approximately 85%.

Figure 7:
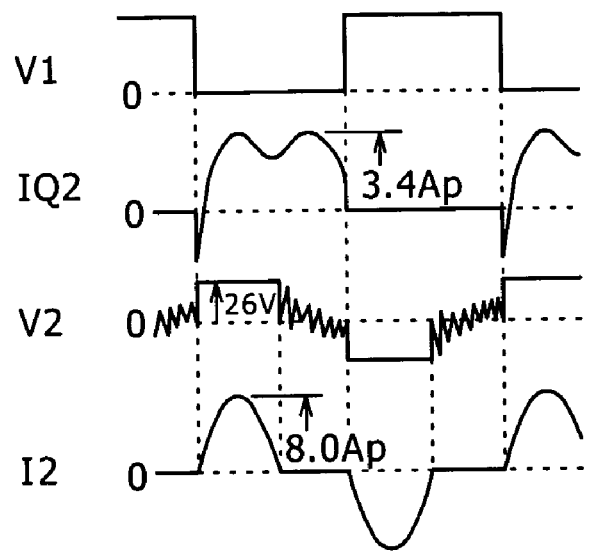
FIG. 7 is a waveform diagram illustrating operation waveforms of several components of the power supply circuit of FIG. 1 at AC 100 V.
Figure 8:
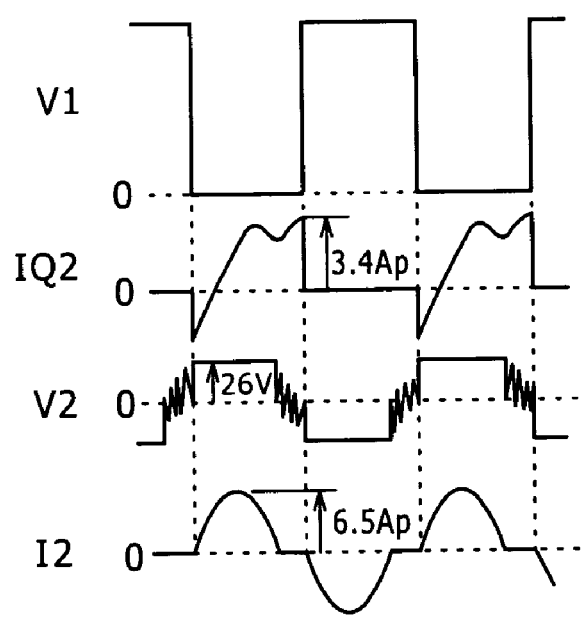
FIG. 8 is a waveform diagram illustrating operation waveforms of several components of the power supply circuit of FIG. 1 at AC 230 V.

FIGS. 7 and 8 are operation waveform diagrams illustrating operations of several components of the circuit shown in FIG. 1.

In particular, FIGS. 7 and 8 show operation waveforms when the load power Po is Po=150 W (secondary side DC output voltage Eo=25 V and load current=6 A). More particularly, FIG. 7 shows operation waveforms at the AC input voltage VAC=100 V while FIG. 8 shows operation waveforms at the AC input voltage VAC=230 V.

It is to be noted that, in the circuit shown in FIG. 1, the maximum load power Pomax is the load power Po=150 W described above.

In order to obtain the results illustrated in FIGS. 7 and 8, the pertaining components of the power supply circuit shown in FIG. 1 were set in the following manner.

First, with regard to the insulating converter transformer PIT, the gap length of the gap G of the EE type core was set to 1.6 mm, and the turn numbers of the primary winding N1 and the secondary winding N2 were set to N1=42 T and N2A=N2B=4 T, respectively. By the structure described, the coupling coefficient k of the insulating converter transformer PIT itself was k=approximately 0.65.

Meanwhile, the resonance capacitors for forming the primary side series resonance circuit, secondary side resonance circuits and primary side partial voltage resonance circuit were set in the following manner:

primary side series resonance capacitor C1=0.033 μF
secondary side series resonance capacitor C2A=secondary side series resonance capacitor C2B=1.0 μF.

By the setting described, the resonance frequency fo1 was set to approximately 60 kHz and the resonance frequency fo2 was set to approximately 65 kHz. In other words, the resonance frequency fo2 was set to approximately 1.1 times the resonance frequency fo1 within the range of "fo2=fo1× (0.9 to 1.1)" as specified hereinabove.

It is to be noted that, while the resonance frequency fo2 in this instance is set to a higher value than the resonance frequency fo1, where the resonance frequency fo2 is set higher in this manner, the capacitance of a film capacitor used as the secondary side series resonance capacitor C2 can be set comparatively low, and a film capacitor less expensive as much can be selectively used. In other words, the production cost of the circuit can be reduced as much.

Referring to FIGS. 7 and 8, a voltage V1 of a rectangular waveform represents a voltage across the switching element Q2 and indicates on/off timings of the switching element Q2.

The voltage V1 has a waveform which exhibits the 0 level within an on period within which the switching element Q2 conducts and is on, but is clamped at the level of the rectified smoothed voltage Ei within an off period within which the switching element Q2 is non-conducting.

Within a period within which the switching element Q2 is on, the switching current IQ2 of a waveform shown in FIG. 7 or 8 flows to the switching circuit system formed from the switching element Q2 and the damper diode DD2. The switching current IQ2 exhibits the 0 level within an off period of the switching element Q2.

Further, though not shown in any of FIGS. 7 and 8, the voltage across the other switching element Q1 and the switching current flowing through the other switching circuit (Q1, DD1) have waveforms obtained by shifting the waveforms of the voltage V1 and the switching current IQ2 by 180°, respectively. In other words, the switching element Q1 and the switching element Q2 perform switching operations at the same cyclical timings such that they are turned on/off alternately.

It is to be noted that the primary side series resonance current Io flowing through the primary side series resonance circuit (L1-C1) is a composite component of the switching current flowing through the switching circuits (Q1, DD1) and (Q2, DD2) described hereinabove.

Further, FIG. 7 illustrates that, also in this instance, the peak level of the switching current IQ2 when the AC input voltage VAC is VAC=100 V is 3.4 Ap. Meanwhile, the peak level of the switching current IQ2 when the AC input voltage VAC is VAC=230 V is 3.0 Ap as seen in FIG. 8.

Then, in response to the primary side series resonance current Io flowing in this manner, an alternating voltage V2 having such a waveform as seen in FIG. 7 or 8 is induced in the secondary winding N2B (similarly also in the secondary winding N2A side) mounted on the secondary side of the insulating converter transformer PIT. The length of one cycle of the alternating voltage V2 corresponds to the switching cycle of the primary side, and the peak level of the alternating voltage V2 has a waveform clamped at 26 V substantially corresponding to the level of the secondary side DC output voltage Eo as seen in FIG. 7 or 8.

Within one of two half cycles of the alternating voltage V2, the rectification diodes [Do1, Do4] on the secondary side conduct and rectification current flows through the rectification diodes [Do1, Do4] as described hereinabove. Within the other half cycle of the alternating voltage V2, the rectification diodes [Do2, Do3] on the secondary side conduct and rectification current flows through the rectification diodes [Do2, Do3]. Further, the secondary winding current I2 flowing through the secondary windings [N2A, N2B] is composite current of the rectification current flowing for every half cycle of the alternating voltage V2 and has such a waveform as seen in FIG. 7 or 8.

As seen in FIG. 7 or 8, a result is obtained that the peak level of the secondary winding current I2 is 8.0 Ap at the AC input voltage VAC of VAC=100 V illustrated in FIG. 7, but is 6.5 Ap at the AC input voltage VAC of VAC=230 V illustrated in FIG. 8.

In short, while, with the configuration which includes one secondary winding and one rectification circuit as described above, the peak level (level between positive and negative peaks) of rectification current when the AC input voltage VAC is VAC=100 V is 32 Ap-p, the peak level (level between positive and negative peaks) of rectification current in the circuit of FIG. 1 when the AC input voltage VAC is VAC=100 V is 16 Ap-p.

In this manner, according to the configuration of FIG. 1, the peak level of rectification current indicates reduction thereof to one half when compared with that in the alternative case wherein a single secondary winding and a single rectification circuit are used, and consequently, the conduction loss of the rectification elements on the secondary side decreases. As the conduction loss decreases in this manner, the power conversion efficiency is enhanced.

According to an experiment, a result was obtained that the power conversion efficiency ηAC→DC of the circuit shown in FIG. 1 was ηAC→DC=approximately 88.0% under the conditions of the load power Po=150 W and the AC input voltage VAC=100 V.

Further, a result was obtained that the power conversion efficiency ηAC→DC of the circuit shown in FIG. 1 was ηAC→DC=approximately 89.8% under the conditions of the load power Po=150 W and the AC input voltage VAC=230 V.

Since the peak level of rectification current decreases as described above, also the withstanding voltage level of the rectification elements can be lowered. In the circuit of FIG. 1, since such a peak level as described above is obtained, a device having voltage and current withstanding properties of 40 V/10 A can be selectively used for the twin Schottky barrier diodes TSD1 and TSD2. In short, since a device of a smaller size when compared with the above-described device having the voltage and current withstanding properties of 40 V/30 A can be selectively used, also the size of the circuit can be reduced as much.

As described above, the power supply circuit of the present embodiment shown in FIG. 1 can be configured so as to be ready for the wide range only through switching frequency control.

Consequently, such a configuration as to change over the rectification operation of a rectification circuit system for producing a direct input voltage (Ei) in response to the rated level of the commercial AC power supply or to change over the type of a switching converter between the half bridge coupling type and the full bridge coupling type need not be adopted any more in order to make it possible for a power supply circuit to be ready for the wide range.

Where the necessity for such a configuration for changing over the circuit as described above is eliminated, for example, the number of smoothing capacitors Ci can be reduced to one, and the number of switching elements can be reduced to only two necessary at least for half bridge coupling. Consequently, reduction of the number of circuit components, reduction of the circuit scale and reduction of switching noise can be anticipated as much.

Further, where the configuration for changing over a circuit is eliminated, there is no necessity to provide a special configuration for prevention of a malfunction involved in such changeover. Also in this regard, suppression of increase of the number of components and the cost can be anticipated. Furthermore, since a standby power supply for prevention of a malfunction is not required, the range of apparatus to which the power supply circuit can be applied can be expanded.

Further, in order to achieve such advantages of the embodiment as described above, only a secondary side series resonance capacitor is required as a minimum necessary part to be added to the conventional configuration of a current resonance type converter which includes a series resonance circuit only on the primary side. In other words, a configuration ready for the wide range can be achieved by addition of a much smaller number of parts than that required where a configuration according to a conventional circuit changing over method is adopted.

Further, where the necessary control range Δfs of the switching frequency is reduced significantly in such a manner as described hereinabove, also the responsibility of constant voltage control is enhanced significantly irrespective of whether the power supply circuit is ready for the wide range or for a single range.

In particular, some electronic apparatus operate with the load power Po which varies in response to a load applied thereto in such a manner as to switch (change over) at a comparatively high speed between those in a maximum load condition and a no-load condition. For example, a printer which is one of pieces of peripheral equipment of a personal computer is one of such apparatus which operate as such a switching load as just described.

If, for example, such a power supply circuit having a comparatively wide necessary control range Δfs as shown in FIG. 14 is incorporated in an apparatus which operates as such a switching load as described above, then variation control of the switching frequency fs by a correspondingly great variation following up a steep variation of the load power is performed as described hereinabove. Therefore, it is difficult to achieve a high speed responsibility of constant voltage control.

In contrast, with the power supply circuit of the present embodiment, since the necessary control range Δfs is reduced significantly particularly within a region of every single range as hereinafter described, it is possible to stabilize the secondary side DC output voltage Eo at a high speed in response to a steep variation of the load power Po between a maximum load condition and a no-load condition. In short, the responding performance of constant voltage control to a switching load is enhanced significantly.

Incidentally, according to an experiment, under the conditions of the pertaining components described hereinabove, the switching frequency fs was fs=64.9 to 68.0 kHz with respect to the variation of the load power Po of Po=0 to 150 W at the AC input voltage VAC=100 V, and consequently, a result was obtained that the necessary control range Δfs of the circuit shown in FIG. 1 was Δfs=3.1 kHz when a power supply of the 100 V type was used.

On the other hand, when the AC input voltage VAC was VAC=230 V, the switching frequency fs was fs=84.7 to 89.3 kHz with respect to the same variation of the load power Po of Po=0 to 150 W, and consequently, the necessary control range Δfs was 4.6 kHz when a power supply of the 200 V type was used.

Further, from the results described above, the frequency variation range ΔfsA for making the power supply circuit ready for the wide range is ΔfsA=approximately 24.4 kHz from the switching frequency fs of fs=64.9 to 89.3 kHz.

Also from this, it can be recognized that the necessary control range in the present embodiment is reduced significantly when compared with that of the conventional power supply circuit which requires several hundreds kHz.

Now, a configuration of a modification to the first embodiment described hereinabove is described with reference to a circuit diagram of FIG. 9.

Figure 9:
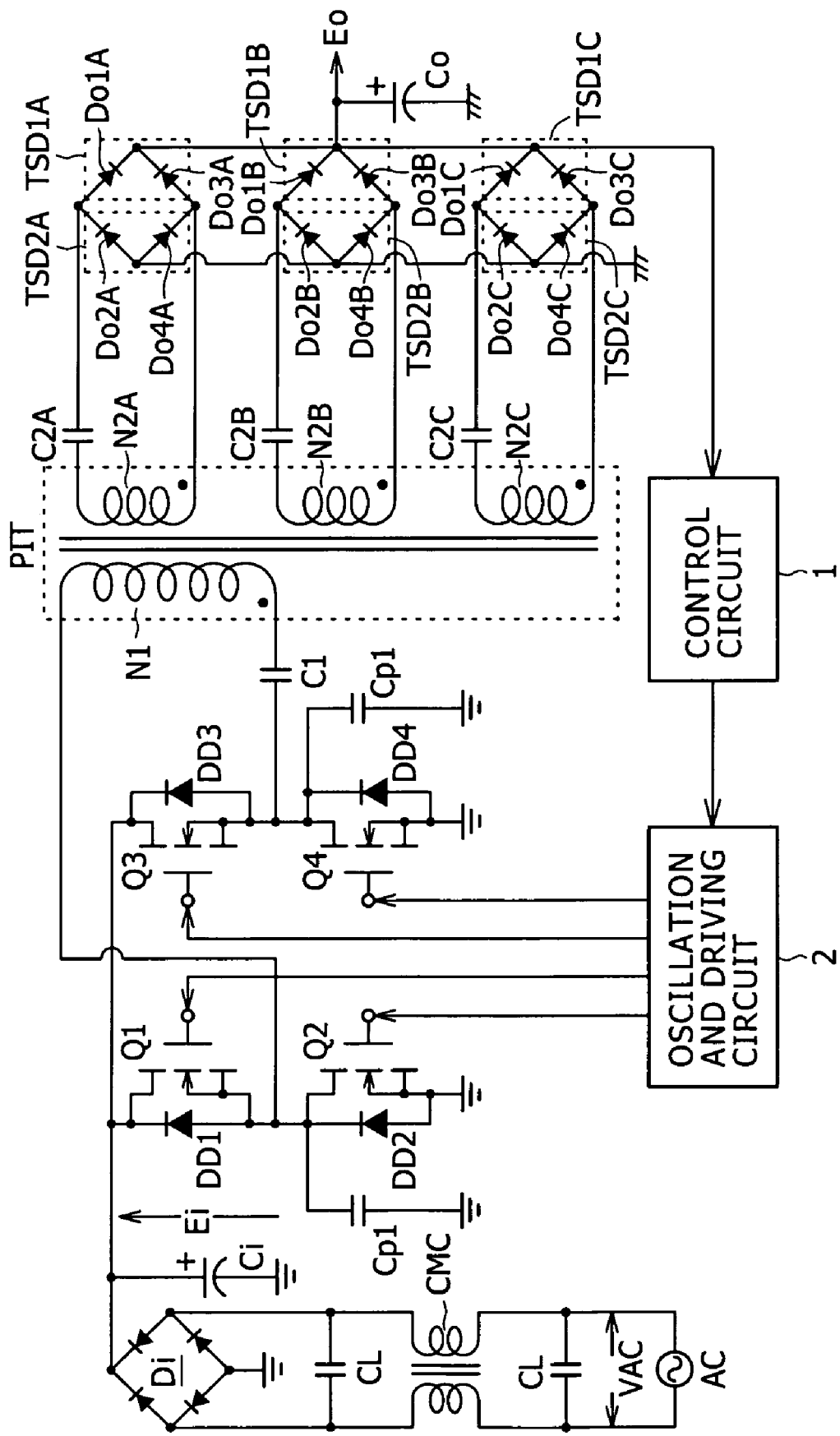
FIG. 9 is a circuit diagram showing a configuration of a power supply circuit as a modification to the power supply circuit of FIG. 1.

The modified power supply circuit shown in FIG. 9 is different from the power supply circuit of the first embodiment in that the configuration of the switching converter on the primary side is changed from that of the half bridge coupling type to that of the full bridge coupling type and besides a further secondary winding is additionally provided so that the power supply circuit can be ready for a heavier load condition.

Referring to FIG. 9, as a full bridge coupling form, a half bridge connection of switching elements Q3 and Q4 is connected in parallel to the half bridge connection of switching elements Q1 and Q2.

The switching elements Q3 and Q4 have damper diodes DD3 and DD4, which are body diodes, connected between the drain-source thereof, respectively, similarly to the switching elements Q1 and Q2.

Further, in this instance, the primary side series resonance circuit formed from a series connection of the primary winding N1 of the insulating converter transformer PIT and the primary side series resonance capacitor C1 is connected in the following manner.

First, one end (winding starting end) of the primary winding N1 which is one end of the primary side series resonance circuit is connected to a node between the source of the switching element Q1 and the drain of the switching element Q2. The node between the source of the switching element Q1 and the drain of the switching element Q2 serves as one of switching output points of the switching circuit system of the full bridge coupling.

Meanwhile, with regard to the other end portion of the primary side series resonance circuit, the other end (winding ending end) of the primary winding N1 is connected to a node between the source of the switching element Q3 and the drain of the switching element Q4 which serves as the other switching output point through the series connection of the primary side series resonance capacitor C1.

Further, in this instance, a primary side partial resonance capacitor Cp1 is connected in parallel between the source and the drain of the switching element Q4. The capacitance also of the primary side partial resonance capacitor Cp1 cooperates with the leakage inductance L1 of the primary winding N1 to form a parallel resonance circuit (partial voltage resonance circuit) so that a partial voltage resonance operation wherein voltage resonance occurs only upon turning off of the switching elements Q3 and Q4 is obtained.

The oscillation and driving circuit 2 in this instance drives four switching elements, that is, the switching elements Q1 to Q4. In particular, the oscillation and driving circuit 2 drives the set of the switching elements [Q1, Q4] and the set of the driving elements [Q2, Q3] to switch such that they are turned on/off alternately.

Here, for example, if the load condition is inclined to become heavier, then the current flowing through the switching converter increases and also the burden on the circuit parts becomes heavier and besides the power loss increases. Thus, if the full bridge coupling is adopted as described above, then since the necessary load current can be supplied from the four switching elements, the burden on each element decreases when compared with, for example, that of the half bridge coupling form which includes two switching elements, and also the power loss decreases. This is advantageous for the heavy load condition.

Further, the circuit of FIG. 9 includes, as the secondary winding N2, three secondary windings, that is, a secondary winding N2A, another secondary winding N2B and a further secondary winding N2C in order to be ready for a heavy load condition.

Also to the secondary winding N2C newly added, a secondary side series resonance capacitor C2C similar to those connected to the secondary winding N2A and the secondary winding N2B is connected in series to form a series resonance circuit similarly. Further, a bridge rectification circuit is formed from rectification diodes Do1 to Do4 similarly to the bridge rectification circuits connected to the secondary winding N2A and the secondary winding N2B. The rectification diodes Do1 to Do4 of the bridge rectification circuit connected to the secondary winding N2C are referred to as rectification diodes Do1C to Do4C, respectively.

It is to be noted that, also in this instance, a twin Schottky barrier diode TSD is selectively used for each of the rectification diodes [Do1C, Do3C] and the rectification diodes [Do2C, Do4C]. In this instance, the twin Schottky barrier diode TSD which functions as the rectification diodes [Do1C, Do3C] is referred to as twin Schottky barrier diode TSD1C, and the twin Schottky barrier diode TSD which functions as the rectification diodes [Do2C, Do4C] is referred to as twin Schottky barrier diode TSD2C.

Also in this instance, rectification outputs of the three rectification circuits are smoothed by a single smoothing capacitor Co provided commonly for the three rectification circuits to produce the secondary side DC output voltage Eo.

According to the configuration described, the rectification current level flowing through the secondary side can be further reduced when compared with that in the case of the circuit shown in FIG. 1.

In other words, deterioration of the power conversion efficiency in a heavy load condition can be suppressed efficiently. Accordingly, also in this regard, the power supply circuit is ready for a heavier load condition.

It is to be noted that, particularly according to the circuit configuration of FIG. 9, a power conversion efficiency sufficient for practical use can be maintained against the variation of the load power Po of Po=0 to 300 W.

Figure 10:
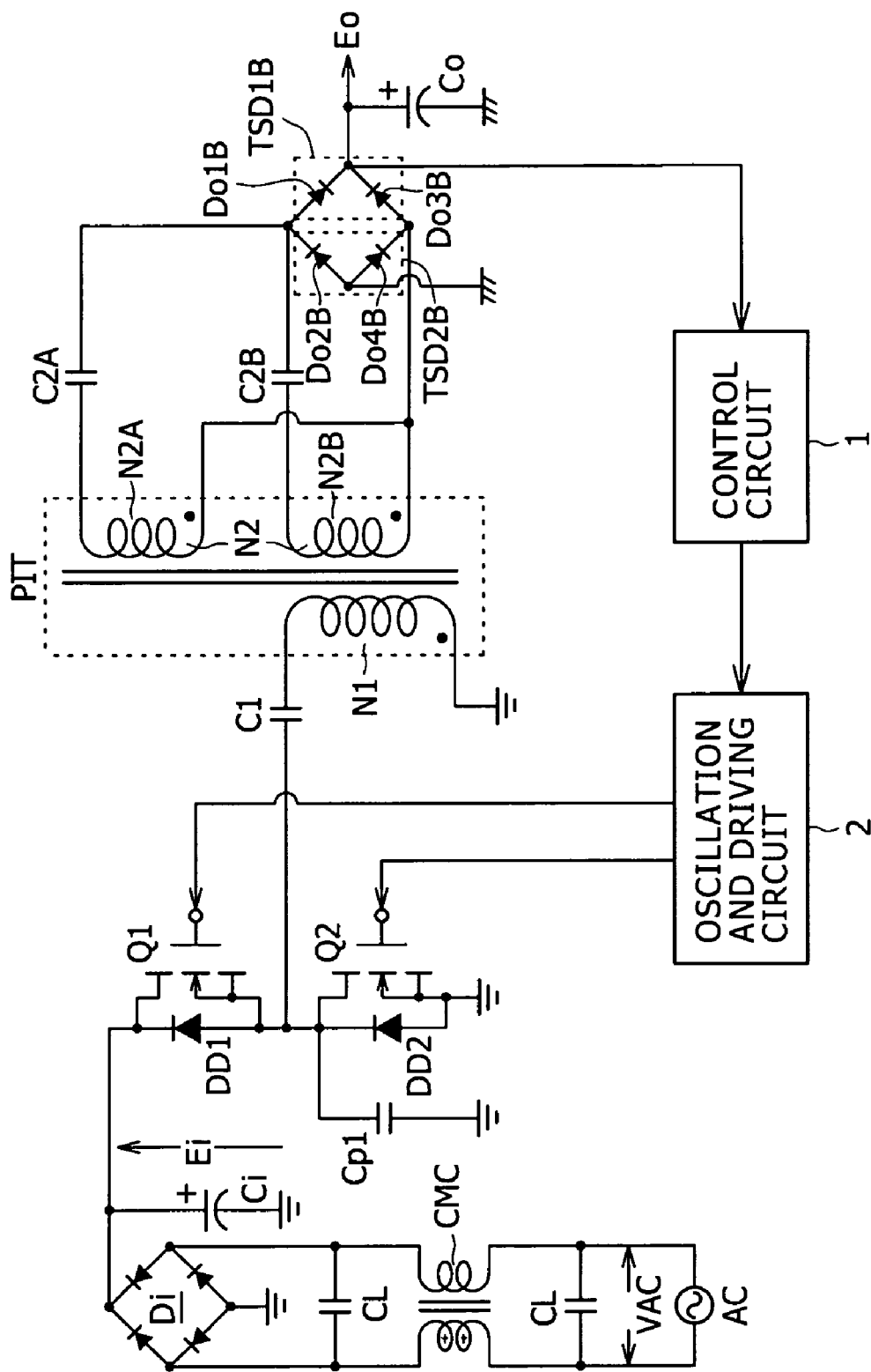
FIG. 10 is a circuit diagram showing a configuration of a power supply circuit as another modification to the power supply circuit of FIG. 1.

FIG. 10 shows another modification to the power supply circuit of the first embodiment.

The modified power supply circuit shown in FIG. 10 is different from the power supply circuit shown in FIG. 1 in that a rectification circuit connected to one of the secondary windings is omitted from the configuration of the secondary side shown in FIG. 1.

In particular, in this instance, for example, the bridge rectification circuit (twin Schottky barrier diodes TSD1A and TSD2A) connected to the secondary winding N2A side is omitted, and the end portion of the secondary side series resonance circuit, which is formed from the secondary winding N2A and the secondary side series resonance capacitor C2A, adjacent the secondary side series resonance capacitor C2A is connected to the end portion of the secondary side series resonance circuit, which is formed from the secondary winding N2B and the secondary side series resonance capacitor C2B, adjacent the secondary side series resonance capacitor C2B.

Further, the other end portion of the secondary side series resonance circuit formed from the secondary winding N2A and the secondary side series resonance capacitor C2A is connected to the other end portion of the secondary side series resonance circuit formed from the secondary winding N2B and the secondary side series resonance capacitor C2B.

According to the connection scheme described, the common bridge rectification circuit formed from the twin Schottky barrier diodes TSD1B and TSD2B is connected to the secondary winding N2A and the secondary winding N2B connected in parallel.

According to such a configuration of FIG. 10 as described above, since one of the two bridge rectification circuits can be omitted, the number of elements can be reduced to achieve miniaturization of the circuit.

In this instance, since the secondary winding N2A and the secondary winding N2B are connected in parallel, the secondary winding current level when the same load is supplied with secondary winding current can be reduced when compared with that where a single secondary winding is used, and deterioration of the efficiency can be suppressed as much.

In this instance, however, since the levels of current flowing through the rectification elements are equal to each other, there is the necessity to increase the current withstanding level of the twin Schottky barrier diodes TSD1B and TSD2B in this instance when compared with that by the circuit of FIG. 1.

It is described here for the confirmation that it is possible to combine the configuration of the secondary side shown in FIG. 1 or 10 with the configuration of the full bridge coupling form of the primary side described above with reference to FIG. 9.

Figure 11:
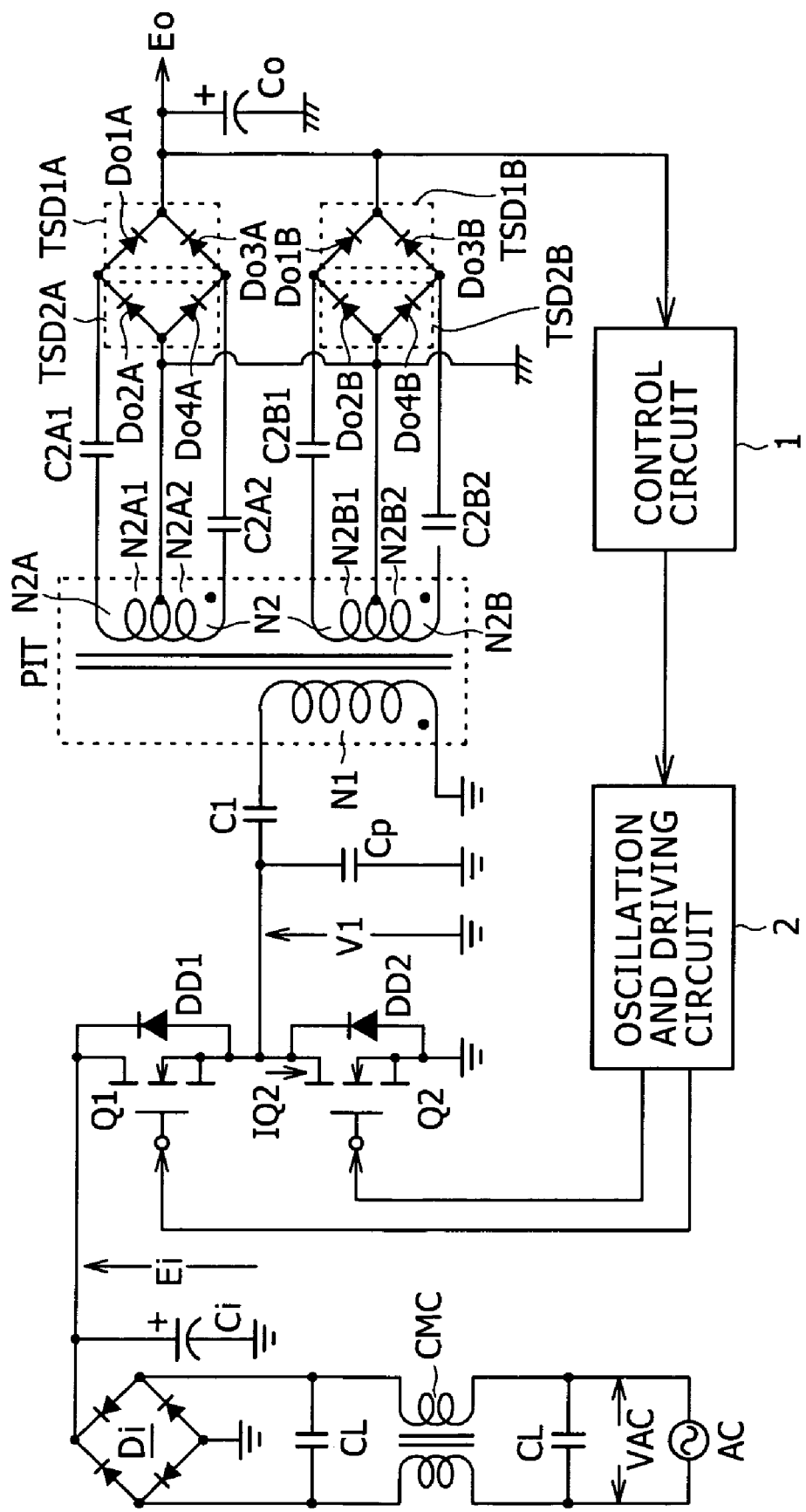
FIG. 11 is a circuit diagram showing an example of a configuration of a power supply circuit according to a second embodiment of the present invention.

FIG. 11 shows an example of a configuration of another power supply circuit to which the present invention is applied.

The power supply circuit of the present second embodiment has a basic configuration similar to that of the power supply circuit of the first embodiment and includes a voltage doubler rectification circuit as a rectification circuit on the secondary side.

Also the circuit shown in FIG. 11 is ready for the condition of the load power Po=150 to 0 W (secondary side DC output voltage Eo 25 V) similarly to the circuit shown in FIG. 1.

Referring to FIG. 11, a center tap is provided for each of the secondary winding N2A and the secondary winding N2B to divide the secondary windings N2A and N2B into secondary winding portions N2A1 and N2A2 and secondary winding portions N2B1 and N2B2, respectively. In this instance, the center taps of the secondary winding N2A and the secondary winding N2B are grounded to the secondary side ground.

First, on the secondary winding N2A side, an end portion of the secondary winding portion N2A1 side which is a winding starting end portion of the secondary winding N2A is connected to a node between the anode of the rectification diode Do1A and the cathode of the rectification diode Do2A through a series connection of a secondary side series resonance capacitor C2A1.

Meanwhile, an end portion of the secondary winding portion N2A2 side which is a winding ending end portion of the secondary winding N2A is connected to a node between the anode of the rectification diode Do3A and the cathode of the rectification diode Do4A through a series connection of a secondary side series resonance capacitor C2A2.

Further, a node between the rectification diode Do1A and the cathode of the rectification diode Do3A is connected to the positive terminal of the smoothing capacitor Co. Also in this instance, a node between the rectification diodes Do2A and Do4A is connected to the secondary side ground. Meanwhile, the negative terminal of the smoothing capacitor Co is connected to the secondary side ground.

On the other hand, on the secondary winding N2B side, the secondary winding portion N2B1, the secondary winding portion N2B2, a secondary side series resonance capacitor C2B1, another secondary side series resonance capacitor C2B2 and rectification diodes Do1B to Do4B shown in FIG. 11 are connected in a connection scheme similar to that of the secondary winding portion N2A1, secondary winding portion N2A2, secondary side series resonance capacitor C2A1, secondary side series resonance capacitor C2A2 and rectification diodes Do1A to Do4A.

Further, also in this instance, a node between the cathode of the rectification diode Do1B and the cathode of the rectification diode Do3B is connected to the positive terminal of the smoothing capacitor Co.

It is to be noted that, also in this instance, for the rectification diodes Do1 and Do3 and the rectification diodes Do2 and Do4, a twin Schottky barrier diode TSD (TSD1A, TSD2A, TSD1B, TSD2B) is selectively used similarly as in the power supply circuit of FIG. 1.

The voltage doubler full wave rectification circuit formed in the connection scheme described above performs the following rectification operation.

First, the voltage doubler full wave rectification circuit can be divided, on the secondary winding N2A side and the secondary winding N2B side, into a first voltage doubler half wave rectification circuit formed from the [secondary winding portion N2A1, secondary side series resonance capacitor C2A1, rectification diodes Do1A and Do2A] and the [secondary winding portion N2B1, secondary side series resonance capacitor C2B1, rectification diodes Do1B and Do2B] and a second voltage doubler half wave rectification circuit formed from the [secondary winding portion N2A2, secondary side series resonance capacitor C2A2, rectification diodes Do3A and Do4A] and the [secondary winding portion N2B2, secondary side series resonance capacitor C2B2, rectification diodes Do3B and Do4B].

Further, in the first voltage doubler half wave rectification circuit, since series connection circuits of the [secondary winding portion N2A1—secondary side series resonance capacitor C2A1] and the [secondary winding portion N2B1—secondary side series resonance capacitor C2B1] are formed, first secondary side resonance circuits are formed from the leakage inductance component (L2A1) of the secondary winding portion N2A1 and the capacitance of the secondary side series resonance capacitor C2A1 and from the leakage inductance component (L2B1) of the secondary winding portion N2B1 and the capacitance of the secondary side series resonance capacitor C2B1.

Similarly, in the second voltage doubler half wave rectification circuit, since series connection circuits of the [secondary winding portion N2A2—secondary side series resonance capacitor C2A2] and [secondary winding portion N2B2—secondary side series resonance capacitor C2B2] are formed, second secondary side series resonance circuits are formed from the leakage inductance component L2A2 of the second winding portion N2A2 and the capacitance of the secondary side series resonance capacitor C2A2 and from the leakage inductance component L2B2 of the second winding portion N2B2 and the capacitance of the secondary side series resonance capacitor C2B2.

The first voltage doubler half wave rectification circuit performs the following rectification operation.

First, a rectification operation on the secondary winding N2A side is described. Within one of two half cycles of an alternating voltage induced in the secondary winding N2A, rectification current flows along a route of the secondary winding portion N2A1—rectification diode Do2A—secondary side series resonance capacitor C2A1 so that it is charged into the secondary side series resonance capacitor C2A1. By the rectification operation in this instance, a voltage of a level equal to the alternating voltage induced in the secondary winding portion N2A1 is produced across the secondary side series resonance capacitor C2A1.

Then, within a next period of the other half cycle of the alternating voltage of the secondary winding N2A, rectification current flows along another route of the secondary side series resonance capacitor C2A1—rectification diode Do1A—smoothing capacitor Co. At this time, charging of the smoothing capacitor Co is performed in a state wherein the voltage across the secondary side series resonance capacitor C2A1 obtained by the rectification operation within the period of the preceding half cycle of the alternating voltage of the secondary winding N2A is superposed on the induced voltage of the secondary winding portion N2A1. Consequently, a voltage equal to twice the alternating voltage of the secondary winding portion N2A1 is produced across the smoothing capacitor Co.

Also the first voltage doubler half wave rectification circuit on the secondary winding N2B side operates in a similar manner as described above.

In particular, within the period of one of two half cycles of the alternating voltage of the secondary winding N2A (secondary winding N2B), a voltage across the secondary side series resonance capacitor C2A1 (C2B1) of a level equal to the alternating voltage of the secondary winding portion N2A1 (secondary winding portion N2B1) is produced. Then, within the period of the other half cycle of the alternating voltage of the secondary winding N2A (secondary winding N2B), the smoothing capacitor Co is charged with a superposed level of the alternating voltage of the secondary winding portion N2A1 (secondary winding portion N2B1) and the voltage across the secondary side series resonance capacitor C2A1 (C2B1). Consequently, a voltage equal to twice the alternating voltage of the secondary winding N2A (N2B) is produced across the smoothing capacitor Co. In this manner, also the first voltage doubler half wave rectification circuit on the secondary winding N2B side performs a voltage doubler half wave rectification operation.

It is to be noted that, in the voltage doubler half wave rectification operation described above, current flows in the positive and negative directions for every half cycle. The first secondary side series resonance circuit performs a resonance operation in response to the current.

Meanwhile, the second voltage doubler half wave rectification circuit includes series connection circuits of the [secondary winding portion N2A2, secondary side series resonance capacitor C2A2, rectification diodes Do3A and Do4A] and [secondary winding portion N2B2, secondary side series resonance capacitor C2B2, rectification diodes Do3B and Do4B] and executes a voltage doubler half wave rectification operation similar to that of the first voltage doubler half wave rectification circuit at cyclic timings shifted by a half cycle from those of the rectification operation of the first voltage doubler half wave rectification circuit. Further, by the rectification operation just described, the second secondary side series resonance circuit performs a resonance operation.

Since such a rectification operation is executed, charging of the smoothing capacitor Co by the first voltage doubler half wave rectification circuit and charging of the smoothing capacitor Co by the second voltage doubler half wave rectification circuit are executed repetitively in every half cycle of the alternating voltages of the secondary winding N2A and the secondary winding N2B.

In short, the entire rectification circuit connected to the secondary winding N2A performs a voltage doubler full wave rectification operation wherein charging into the smoothing capacitor Co is performed within periods of one half wave within which the alternating voltage of the secondary winding N2A is positive/negative with a charging potential equal to twice the alternating voltage induced in the secondary winding portions N2A1 and N2A2. Also the entire rectification circuit connected to the secondary winding N2B performs a voltage doubler full wave rectification operation wherein charging into the smoothing capacitor Co is performed within periods of one half cycle within which the alternating voltage of the secondary winding N2B positive/negative with a charging potential equal to twice the alternating voltage induced in the secondary winding portions N2B1 and N2B2.

By the rectification operation described, a secondary side DC output voltage Eo which is a rectified smoothed voltage equal to twice the alternating voltage induced in the secondary winding portions N2A1 and N2A2, and N2B1 and N2B2 is obtained across the smoothing capacitor Co.

It is to be noted that the pertaining elements of the power supply circuit of the second embodiment shown in FIG. 11 were selectively set in the following manner:

insulating converter transformer PIT: gap G=1.6 mm, coupling coefficient k=0.65
primary winding N1=42 T
secondary winding N2A=N2A1+N2A2=2 T+2 T=4 T
secondary winding N2B=N2B1+N2B2=2 T+2 T=4 T
primary side series resonance capacitor C1=0.033 µF
secondary side series resonance capacitor C2A1=C2A2=C2B1=C2B2=1.0 µF In short, also in the second embodiment, in order to set the coupling coefficient k to k=approximately 0.65, for example, a gap length of approximately 1.6 mm is set for the gap G formed in the inner magnetic leg of the core of the insulating converter transformer PIT of the structure shown in FIG. 2 similarly as in the power supply circuit of the first embodiment shown in FIG. 1.

This achieves a configuration ready for the wide range.

Further, by such setting of the primary side series resonance capacitor C1 and the secondary side series resonance capacitors C2 as described hereinabove, also in this instance, the resonance frequency fo1 is set to fo1=approximately 60 kHz and the resonance frequency fo2 is set to fo2=approximately 65 kHz. In other words, the resonance frequencies fo1 and fo2 are set such that the resonance frequency fo2 may remain within the range of fo2=fo1× approximately 0.9 to 1.1 so that the peak levels of the substantially M-shaped waveform of the primary side series resonance current Io may be equal to each other. Consequently, further enhancement of the power conversion efficiency and effective reduction of the necessary control range can be anticipated.

Also in this instance, since two secondary windings are wound on the insulating converter transformer PIT such that the secondary side DC output voltage Eo is produced from outputs of the two secondary windings, the level of the rectification current on the secondary side can be reduced as much, which is more advantageous for the heavy load condition.

Furthermore, also in this instance, since the level of the rectification current on the secondary side is suppressed, a small size package part of 40 V/10 A can be selectively used for the twin Schottky barrier diodes TSD.

Incidentally, an experiment was conducted under the selected conditions of the pertaining elements described above, and the following results were obtained with regard to the power conversion efficiency and the switching frequency fs from the circuit of the second embodiment.

First, the ηAC→DC power conversion efficiency ηAC→DC was ηAC→DC=88.0% under the condition of the AC input voltage VAC=100 V at the maximum load of the load power Po=150 W.

Meanwhile, the ηAC→DC power conversion efficiency ηAC→DC was ηAC→DC=89.5% under the AC input voltage VAC=230 V at the load power Po=150 W.

On the other hand, the switching frequency fs was fs=63.5 to 66.9 kHz at the AC input voltage VAC=100 V with respect to the variation of the load power Po=0 to 150 W, and the necessary control range Δfs when a commercial power supply of the AC 100 V type was used was approximately 3.4 kHz.

Meanwhile, the switching frequency fs was fs=83.6 to 88.5 kHz at the AC input voltage VAC=230 V with respect to the same load variation, and the necessary control range Δfs when a commercial power supply of the 200 V type was used was approximately 4.9 kHz.

From this result, the necessary control range ΔfsA when the circuit of FIG. 11 is made ready for the wide range is ΔfsA=approximately 25 kHz from the switching frequencies of 63.5 to 88.5 kHz specified above.

From such a result as described above, also in the second embodiment, the necessary control range Δfs when the power supply circuit is made ready for the wide range is included sufficiently within the frequency variation range of an existing switching driving IC, and a configuration ready for the wide range by switching frequency variation control can be implemented at the level of practical use.

Furthermore, also in this instance, the necessary control ranges Δfs where commercial power supplies of the AC 100 V type and the AC 200 V type are used are lower than 5 kHz, and it can be recognized that the high speed transition responsibility to a switching load can be enhanced significantly.

Figure 12:
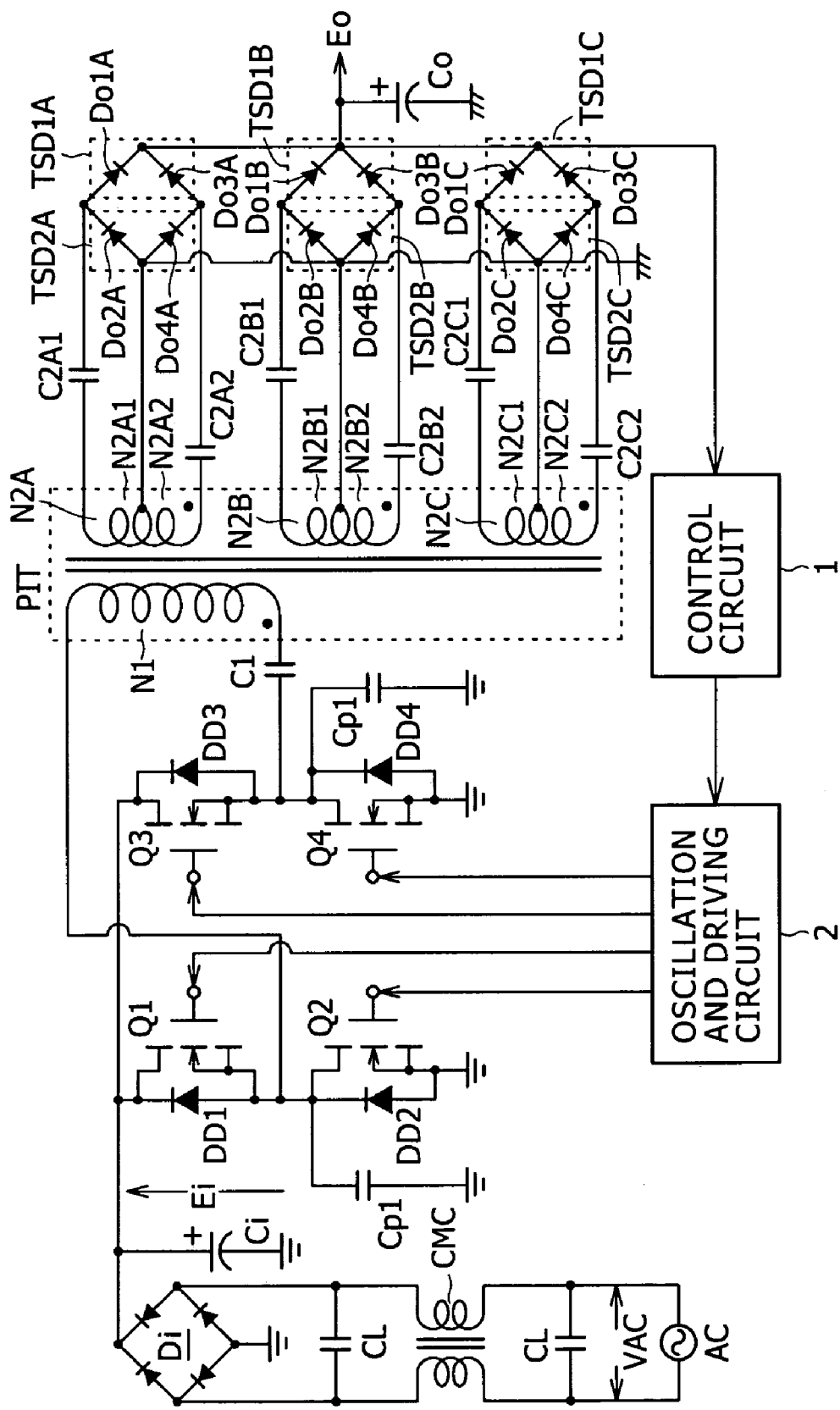
FIG. 12 is a circuit diagram showing a configuration of a power supply circuit as a modification to the power supply circuit of FIG. 11.

FIG. 12 shows a configuration of a power supply circuit as a modification to the power supply circuit of the second embodiment.

The modified power supply circuit is generally configured such that it uses, as a basic configuration, the configuration wherein the rectification circuit on the secondary side is a voltage doubler half wave rectification circuit as seen in FIG. 11. Further, the modified power supply circuit is configured such that the configuration of the switching converter on the primary side is set as a configuration of a full bridge coupling type similarly as in the modifications to the first embodiment and similarly a secondary winding N2C is added on the secondary side such that the secondary side DC output voltage Eo is produced from outputs of totaling three primary windings.

In particular, on the secondary side in this instance, the secondary winding N2C (secondary winding portion N2C1 and secondary winding portion N2C2) is added as seen in FIG. 12 to the insulating converter transformer PIT, and a secondary side series resonance capacitor C2C1, another secondary side series resonance capacitor C2C2 and rectification diodes Do1C to Do4C are connected in a connection scheme similar to that in the rectification circuits connected to the secondary windings shown in FIG. 11 to the secondary winding N2C to form a voltage doubler half wave rectification circuit.

Also with such a configuration of the modification to the second embodiment as described above, the power supply circuit can be ready for a heavier load condition similarly to the circuit shown in FIG. 9. For example, also in this instance, a practically usable power conversion efficiency can be maintained within the range of the load power Po=0 to 300 W.

Figure 13:
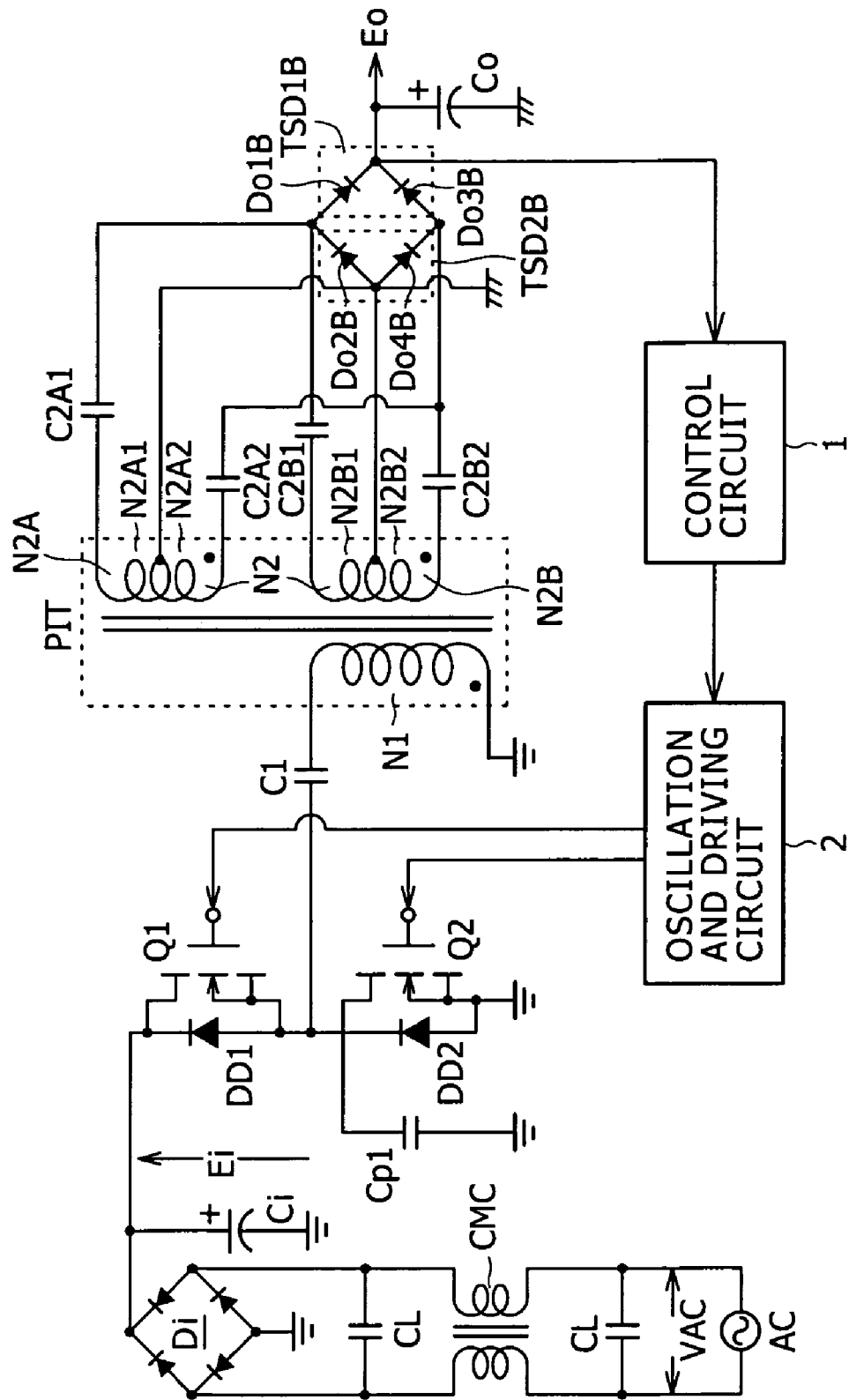
FIG. 13 is a circuit diagram showing a configuration of a power supply circuit as another modification to the power supply circuit of FIG. 11.

FIG. 13 shows a configuration of another modification to the second embodiment.

The modified power supply circuit of FIG. 13 is generally configured such that the circuit configuration shown in FIG. 11 is used as a basic configuration thereof and the bridge rectification circuit formed from the rectification diodes Do1A to Do4A are omitted as in the modification to the first embodiment shown in FIG. 10 while alternating voltages obtained by the secondary winding N2A and the secondary winding N2B are rectified only by the bridge rectification circuit formed from the rectification diodes Do1B to Do4B.

In particular, the bridge rectification circuit formed from the rectification diodes Do1A to Do4A is omitted from the circuit shown in FIG. 11, and the winding starting end portion of the secondary winding N2A (end portion on the secondary winding portion N2A1 side) is connected to a node between the rectification diodes Do1B and Do2B through a series connection of the secondary side series resonance capacitor C2A1. Further, the winding ending end portion of the secondary winding N2A (end portion on the secondary winding portion N2A2 side) is connected to a node between the rectification diodes Do3B and Do4B through a series connection of the secondary side series resonance capacitor C2A2.

Also with the modification to the second embodiment, since one of the bridge rectification circuits can be omitted, reduction of the circuit area can be anticipated. Also in this instance, since the secondary winding N2 includes two secondary windings of the secondary winding N2A and the secondary winding N2B connected in parallel, the modified power supply circuit is further advantageous for a heavy load condition.

It is to be noted that the configuration of the full bridge coupling form shown in FIG. 12 can be adopted for the power supply circuit of the second embodiment shown in FIG. 11 and the modified power supply circuit shown in FIG. 13.

It is to be noted that the present invention is not limited to the embodiments and the modifications described above.

For example, the insulating converter transformer PIT may have a suitably modified structure beginning with the core type.

Further, while the switching converters described hereinabove in connection with the embodiments are based on a separately excited current resonance type converter, they may otherwise be formed making use of, for example, a self excited current resonance type converter. Further, also for the switching elements to be selectively used in the switching converters, an element other than a MOS-FET such as a bipolar transistor or an IGBT (Insulated Gate Bipolar Transistor) may be adopted.

Further, also the constants and so forth of the part elements described hereinabove may be changed suitably in accordance with actual conditions or the like.

Further, as a configuration ready for a heavy load, the rectification current circuit system for receiving a commercial AC power supply AC (AC input voltage VAC) as an input thereto to produce the rectified smoothed voltage Ei may be formed from a voltage doubler half wave rectification circuit which produces the rectified smoothed voltage Ei having a level equal to twice the AC input voltage VAC. However, the configuration wherein the rectification smoothing circuit system for producing the rectified smoothed voltage Ei is formed as a voltage doubler rectification circuit is applied only as a configuration ready for a single range only of the AC 100 V type.

While preferred embodiments of the present invention have been described using specific terms, such description is for illustrative purposes only, and it is to be understood that changes and variations may be made without departing from the spirit or scope of the following claims.

What is claimed is:

1. A switching power supply circuit, comprising:

switching means including a switching element for receiving a DC input voltage as an input thereto to perform switching;

switching driving means for switching driving said switching element operation;

an insulating converter transformer formed by winding a primary winding to which a switching output obtained by the switching operation of said switching means is supplied and a plurality of secondary windings in each of which an alternating voltage is induced by said primary winding;

a primary side series resonance circuit formed from at least a leakage inductance component of said primary winding of said insulating converter transformer and the capacitance of a primary side series resonance capacitor connected in series to said primary winding such that a first resonance frequency is set for making the operation of said switching means that of a current resonance type;

a plurality of secondary side series resonance circuits each formed from at least a leakage inductance component of one of said plural secondary windings of said insulating converter transformer and the capacitance of a secondary side series resonance capacitor connected in series to the plural secondary winding such that a second resonance frequency is set;

secondary side DC output voltage production means for performing a rectification operation for the AC voltages obtained by said secondary windings and smoothing the rectification outputs of said plural secondary windings by means of a common secondary side smoothing capacitor to produce a secondary side DC output voltage; and constant voltage control means for controlling said switching driving means in response to the level of the secondary side DC output voltage to adjust the switching frequency of said switching means to perform constant voltage control for the secondary side DC output voltage, wherein said insulating converter transformer further includes a core which has a gap formed at a predetermined position thereof, the gap having a gap length set so that an output characteristic of an electromagnetic coupling type resonance circuit formed from said primary side and secondary side series resonance circuits when a frequency signal having the switching frequency is inputted to said electromagnetic coupling type resonance circuit becomes a single-humped characteristic.

2. The switching power supply circuit according to claim 1, wherein the first and second resonance frequencies are set so that two peak waveforms of a substantially M shape appearing with the primary side series resonance current to flow to said primary side series resonance circuit have peak levels equal to each other.

3. The switching power supply circuit according to claim 1, wherein said secondary side DC output voltage producing means is formed such that a rectification circuit is provided for each of said secondary windings, and the rectification outputs of the plural rectification circuits are smoothed by the common secondary side smoothing capacitor to produce the secondary side DC output voltage.

4. The switching power supply circuit according to claim 3, wherein said secondary side DC output voltage production means includes a bridge rectification circuit as the rectification circuit.

5. The switching power supply circuit according to claim 1, wherein said secondary side DC output voltage production means includes a common rectification circuit for performing rectification operation for the alternating voltages obtained by said plural secondary windings, and the rectification output of said common rectification circuit is smoothed by said secondary side smoothing capacitor to produce the secondary side DC output voltage.

6. The switching power supply circuit according to claim 5, wherein said secondary side DC output voltage production means includes a bridge rectification circuit as the rectification circuit.

7. The switching power supply circuit according to claim 1, wherein a center tap is provided for each of said secondary windings to divide the secondary winding into a first secondary winding section and a second secondary winding section, and said secondary side DC output voltage production means is formed as a voltage doubler full wave rectification circuit comprising:

a first voltage doubler half wave rectification circuit wherein a first secondary side series resonance circuit is formed from the leakage inductance component of each of the first secondary winding sections and the capacitance of a first secondary side series resonance capacitor and required rectification diodes and said secondary side smoothing capacitor are connected to each of series connecting circuits of the first secondary winding sections and the first secondary side series resonance capacitors so that a voltage doubler half wave rectification operation is performed; and a second voltage doubler half wave rectification circuit wherein a second secondary side series resonance circuit is formed from the leakage inductance component of each of the second secondary winding sections and the capacitance of a second secondary side series resonance capacitor and required rectification diodes and said secondary side smoothing capacitor are connected to each of series connecting circuits of the second secondary winding sections and the second secondary side series resonance capacitors so that a voltage doubler half wave rectification operation is performed, wherein said voltage doubler full wave rectification circuit performs charging into said secondary side smoothing capacitor by the rectification operation of said first voltage doubler half wave rectification circuit and charging into said secondary side smoothing capacitor by the rectification operation of said second voltage doubler half wave rectification circuit alternately at timings of half cycles of the alternating voltages induced in said plural secondary windings.

8. The switching power supply circuit according to claim 1, wherein said switching means includes two switching elements connected to each other by half bridge coupling.

9. The switching power supply circuit according to claim 1, wherein said switching means includes four switching elements connected to each other by full bridge coupling.

10. A switching power supply circuit, comprising:

a switching section including a switching element for receiving a DC input voltage as an input thereto to perform switching;

a switching driving section for switching driving said switching element operation;

an insulating converter transformer formed by winding a primary winding to which a switching output obtained by the switching operation of said switching section is supplied and a plurality of secondary windings in each of which an alternating voltage is induced by said primary winding;

a primary side series resonance circuit formed from at least a leakage inductance component of said primary winding of said insulating converter transformer and the capacitance of a primary side series resonance capacitor connected in series to said primary winding such that a first resonance frequency is set for making the operation of said switching section that of a current resonance type;

a plurality of secondary side series resonance circuits each formed from at least a leakage inductance component of one of said plural secondary windings of said insulating converter transformer and the capacitance of a secondary side series resonance capacitor connected in series to the plural secondary winding such that a second resonance frequency is set;

a secondary side DC output voltage production section for performing a rectification operation for the AC voltages obtained by said secondary windings and smoothing the rectification outputs of said plural secondary windings by means of a common secondary side smoothing capacitor to produce a secondary side DC output voltage; and a constant voltage control section for controlling said switching driving section in response to the level of the secondary side DC output voltage to adjust the switching frequency of said switching section to perform constant voltage control for the secondary side DC output voltage, wherein said insulating converter transformer further includes a core which has a gap formed at a predetermined position thereof, the gap having a gap length set so that an output characteristic of an electromagnetic coupling type resonance circuit formed from said primary side and secondary side series resonance circuits when a frequency signal having the switching frequency is inputted to said electromagnetic coupling type resonance circuit becomes a single-humped characteristic.

11. The switching power supply circuit according to claim 10, wherein the first and second resonance frequencies are set so that two peak waveforms of a substantially M shape appearing with the primary side series resonance current to flow to said primary side series resonance circuit have peak levels equal to each other.

* * * * *